(12) United States Patent
Roos et al.

(10) Patent No.: US 8,826,345 B2
(45) Date of Patent: Sep. 2, 2014

(54) METHOD AND AN APPARATUS FOR DATA STREAMING

(75) Inventors: Joachim Roos, Nacka (SE); Karl Henriksson, Skarpnäck (SE); Lukas Holm, Stockholm (SE)

(73) Assignee: Edgeware AB, Stockholm (SE)

( * ) Notice: Subject to any disclaimer, the term of this patent is extended or adjusted under 35 U.S.C. 154(b) by 762 days.

(21) Appl. No.: 11/896,603

(22) Filed: Sep. 4, 2007

(65) Prior Publication Data

US 2008/0063005 A1    Mar. 13, 2008

Related U.S. Application Data

(60) Provisional application No. 60/842,918, filed on Sep. 8, 2006.

(30) Foreign Application Priority Data

Jan. 9, 2007    (GB) .................................. 0700343.7

(51) Int. Cl.
*H04N 7/173* (2011.01)
*H04N 21/232* (2011.01)

(52) U.S. Cl.
CPC .................................. *H04N 21/232* (2013.01)
USPC .................... 725/90; 725/88; 725/92; 725/93; 725/94

(58) Field of Classification Search
USPC .................................... 725/86–104, 114–118
See application file for complete search history.

(56) References Cited

U.S. PATENT DOCUMENTS

| 6,005,599 | A  | * | 12/1999 | Asai et al. ....................... 725/116 |
| 6,016,382 | A  |   | 1/2000  | Yamagishi et al. |
| 6,067,108 | A  |   | 5/2000  | Yokote et al. |
| 6,430,184 | B1 | * | 8/2002  | Robins et al. .................. 370/392 |
| 6,831,931 | B2 | * | 12/2004 | Coupe et al. ................... 370/535 |

(Continued)

FOREIGN PATENT DOCUMENTS

| EP | 0 606 868 | 7/1994 |
| EP | 0 698 982 | 2/1996 |

(Continued)

OTHER PUBLICATIONS

International Search Report and Written Opinion mailed Mar. 3, 2008 in corresponding International Application No. PCT/EP2007/058882.

(Continued)

*Primary Examiner* — Nathan Flynn
*Assistant Examiner* — Omar S Parra
(74) *Attorney, Agent, or Firm* — Nixon & Vanderhye P.C.

(57) ABSTRACT

An apparatus and a method for data streaming, as well as a combination, of an apparatus for data streaming and a plurality of user devices, are presented. The apparatus is adapted to receive a plurality of streaming requests, including mode requests, from a plurality of user devices, the apparatus comprising a memory unit adapted to store media data in the form of a plurality of payload data sets, a state device adapted to set a mode in accordance with each one of the mode requests, and a streaming unit adapted to stream the payload data sets in accordance with the set modes. The streaming unit is adapted to receive from the memory unit a plurality of control data sub-sets, each comprising at least two edit portions, each comprising data corresponding to an address in the memory unit.

27 Claims, 10 Drawing Sheets

(56) References Cited

U.S. PATENT DOCUMENTS

| | | | |
|---|---|---|---|
| 2003/0084284 A1* | 5/2003 | Ando et al. | 713/163 |
| 2003/0095783 A1* | 5/2003 | Binder et al. | 386/46 |
| 2004/0098748 A1 | 5/2004 | Bo et al. | |
| 2005/0097614 A1* | 5/2005 | Pedlow et al. | 725/90 |
| 2006/0271996 A1 | 11/2006 | Sato | |
| 2007/0160208 A1 | 7/2007 | MacLean et al. | |
| 2008/0219393 A1* | 9/2008 | Toma et al. | 375/E07.243 |

FOREIGN PATENT DOCUMENTS

| | | |
|---|---|---|
| EP | 0 698 982 A2 | 2/1996 |
| WO | WO 04/07332 | 3/1994 |
| WO | WO 99/21362 | 4/1999 |
| WO | WO 99/29107 | 6/1999 |

OTHER PUBLICATIONS

D. Gemmell et al., "Multimedia Storage Servers: A Tutorial" Computer, IEEE Service Center, Los Alamitos, CA, US, vol. 28, No. 5, May 1, 1995, pp. 40-49, XP000517832.

B. Haskell et al., Digital Video: An Introduction to MPEG-2; 13.2 Interactive Television Services 1997, Chapman & Hall, XP002470712.

International Search Report issued for corresponding International patent application No. PCT/EP2007/058880, dated Feb. 22, 2008.

Gemmell D.J., et al., "Multimedia Storage Servers: A Tutorial," Computer, IEEE Service Center, vol. 28, No. 5, May 1995, pp. 40-49.

Office action mailed Apr. 14, 2010 in co-pending U.S. Appl. No. 11/896,610.

Office action mailed Mar. 19, 2010 in co-pending U.S. Appl. No. 11/896,609.

Communication Relating to Search Results mailed Mar. 11, 2008 in corresponding International Application No. PCT/EP/2007/058881.

R. Steinmetz, et al., Multimedia Systems, chapter: Media Server, Apr. 28, 2004, Springer, pp. 132-133, 170-171, XP002470130.

B. Haskell et al., Digital Video: An Introduction to MPEG-2; 13-2 Interactive Television Services 1997, Chapman & Hall, XP002470712.

Office Action mailed Sep. 15, 2010 in co-pending U.S. Appl. No. 11/896,610.

Office Action mailed Sep. 14, 2010 in co-pending U.S. Appl. No. 11/896,609.

U.S. Appl. No. 11/896,609, filed Sep. 4, 2007, Roos et al.
U.S. Appl. No. 11/896,610, filed Sep. 4, 2007, Roos et al.

\* cited by examiner

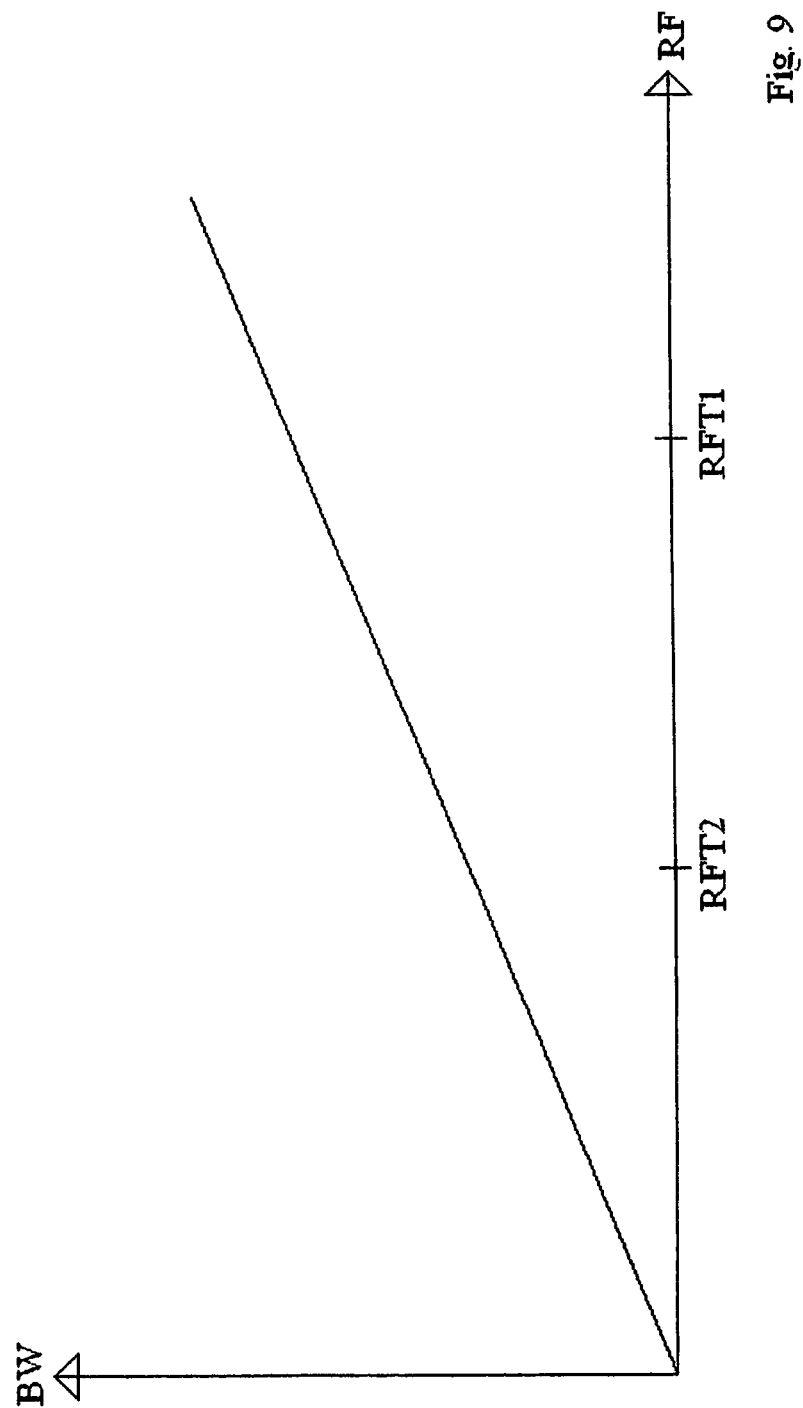

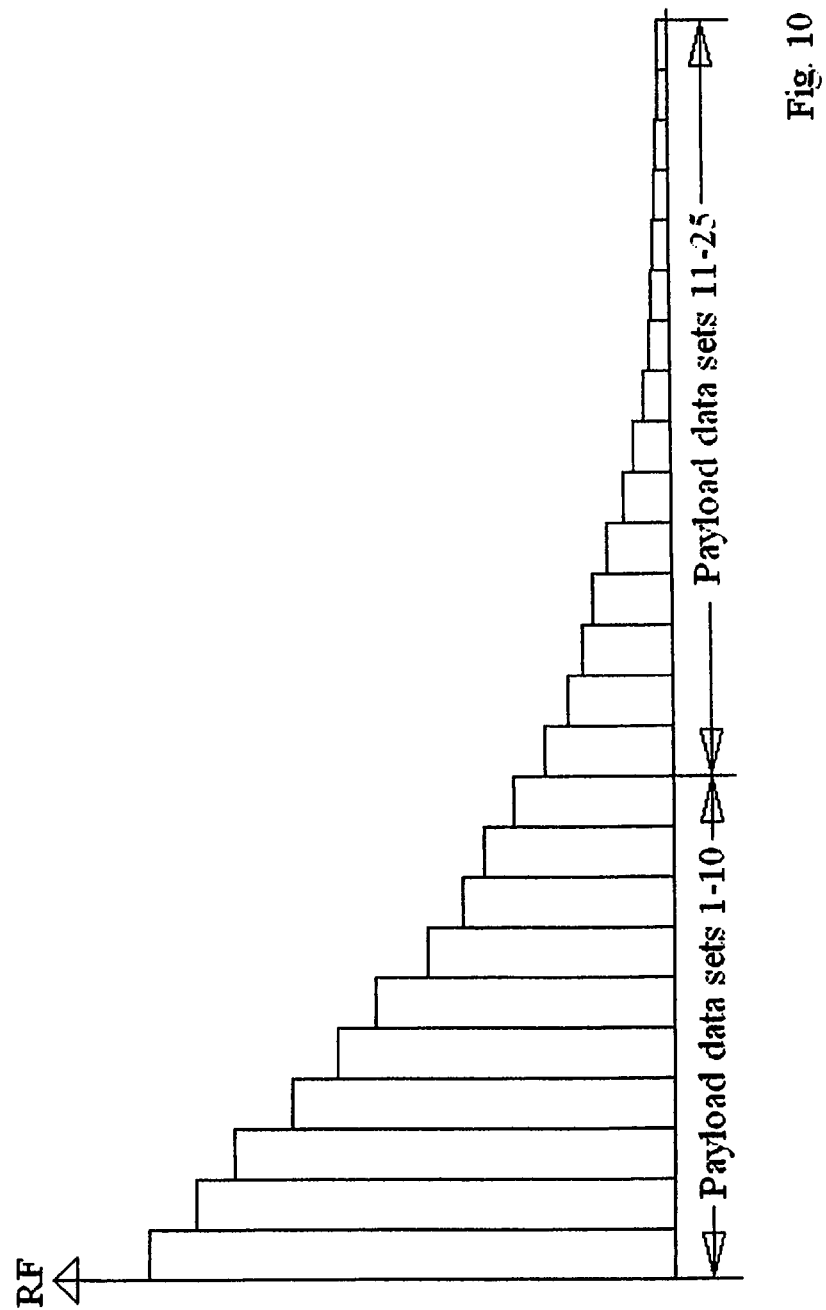

METHOD AND AN APPARATUS FOR DATA STREAMING

This application is a new U.S. utility application claiming priority to U.S. Provisional Patent Application No. 60/842,918, filed 8 Sep. 2006, and GB 0700343.7, filed 9 Jan. 2007, the entire contents of each of which are incorporated by reference.

TECHNICAL FIELD

The present invention relates to an apparatus and a method for data streaming, as well as a combination, of an apparatus for data streaming and a plurality of user devices.

BACKGROUND

Streaming is conventionally performed on data with video, sound or multimedia content, and enables the playback of such data without the need to download the entire resource file in advance of playback. This means that such data has to be sent at a pace corresponding, at least on average, to the pace at which it is to be presented. In many streaming applications, users, e.g. video viewers, have display devices, e.g. television sets or personal computers, that are connectable, e.g. via an IP-network, to a server in which media data is stored.

In the case of videos, each user can request individually a video stored in the server to be displayed, so that the video is displayed to the user immediately upon streaming from the server, i.e. without storage at the display device of the entire video. The stream is normally compressed or coded, for example by MPEG-2, and the display device is adapted to decode it.

Where streaming is to be carried out among a large number of users, with individual data in each stream, conventional storage and computation units, including hard drives, provide a limited capacity, and therefore the number of users that can be served with the use of such equipment is very low compared to the total amount of media consumers.

EP0698982A2 discloses describes a method in which video/multimedia content is stored in switches or routers of a network in the format of network packets, linked with links fields. This means that the video/multimedia content has to be formatted before being stored, and before formatting the video/multimedia content, an amount of network specific information has to be given. For example, a network protocol has to be chosen before formatting and storing of the video/multimedia content. If the such network specific information, e.g. the network protocol, can vary in dependence on users and requests, which is in practice a common case, several versions of a specific video/multimedia content have to be stored, each with individual network specific information. This requires a large amount of storage space, which makes the system complicated and expensive.

US2003/0095783A1 discloses a system in which protocol stacks are generated in hardware as streams are sent to networks. Among other things, the system presented does not support trick-play modes, such as fast forward or reverse video playback modes, in a capacity efficient manner.

U.S. Pat. No. 6,067,108 discloses a streaming device in which an address table is used during streaming to access a memory for media data. The need to repeatedly read, during data streaming, in the address table adds time to the streaming process, which limits the overall capacity of the device.

SUMMARY

Example embodiments provide an apparatus and method that increase the capacity of data streaming, e.g., for user numbers, request numbers, and/or both.

An example embodiment provides an apparatus for data streaming, adapted to receive a plurality of streaming requests, including mode requests, from a plurality of user devices, the apparatus comprising:
a memory unit adapted to store media data in the form of a plurality of payload data sets,
a state device adapted to set a mode in accordance with each one of the mode requests, and
a streaming unit adapted to stream the payload data sets in accordance with the set modes,
the streaming unit being adapted to receive from the memory unit a plurality of control data sub-sets, each comprising at least two edit portions, each comprising data corresponding to an address in the memory unit.

If the streaming unit is adapted to receive from the memory unit a plurality of sub-sets of the payload data sets, each edit portion may comprise data corresponding to a location in the memory unit of a payload data sub-set.

In an example embodiment, the streaming unit receives from the memory unit, along with the sub-sets of payload data, sub-sets control data, each giving a location in the memory unit of a further sub-set of payload data. This means that there is no need to repeatedly read, during data streaming, in a separate information source, such as an address table. Further, the edit portions of the control data sub-sets each gives, in dependence on a respective playback mode, an address to a further sub-set of payload data. Thus, each of the edit portions provides a separate linking structure for the payload data sub-sets in dependence on a respective playback mode, according to an embodiment. Where the payload is a motion picture video, for a mode of normal viewing speed, the edit portions of the control data can provide for a sequential streaming of all payload data sub-sets, whereas in a trick-play mode such as a fast forward mode the edit portions can provide for some of the payload data sub-sets to be skipped in the memory retrieval process. An embodiment provides for a very effective way of controlling trick-play modes by providing pre-stored linking structures in the memory unit, which structures can be followed selectively, without changing the work process of the streaming unit. The streaming unit can therefore be kept relatively simple in its construction, and streaming can be carried out at a high rate regardless of playback modes requested by the user devices.

The fact that there is no need to repeatedly read, during data streaming, in a separate information source, such as an address table, for further memory addresses, memory location information retrieval from a separate source is eliminated, according to an embodiment of the invention. This reduces the number of steps performed in the cyclic streaming operations, which in turn reduced time spent on each stream, so that more streams can be provided, i.e. more users can be served by the apparatus.

Preferably, the streaming unit is adapted to receive from the memory unit a first sub-set of a first payload data set, and a first sub-set of the control data set, which first control data sub-set comprises a first edit portion comprising data corresponding to a location in the memory unit of a second sub-set of the first payload data set, and a second edit portion comprising data corresponding to a location in the memory unit of a third sub-set of the first payload data set. Preferably, the first sub-set of the payload data set and the first sub-set of the control data set are stored at the same location in the memory unit. Preferably, the memory unit comprises a plurality of memory sectors, and wherein the payload data sets and the control data sets are each arranged in pairs of payload data sub-sets and control data sub-sets, each pair being stored in a respective of the memory sectors. Preferably, the apparatus comprises a control unit adapted to receive the payload data sets from at least one data source, and to pre-process the payload data sets before being stored. Preferably, the control unit is adapted to divide a payload data set into a plurality of payload data sub-sets, and create for each of at least some of the payload data sub-sets a control data sub-set. Preferably, the control unit is adapted to locate a plurality of identification data groups within a payload data set, and provide in each of a plurality of the edit portions of the control data sub-sets data corresponding to the location of an identification data group. Preferably, each identification data group corresponds to a full image data frame.

Example embodiments may also comprise a combination of an apparatus as described, and a plurality of user devices, from which the apparatus is adapted to receive the plurality of streaming requests. Preferably, the user devices are audio/video devices. Preferably, the audio/video devices are at least one of set-top boxes, personal video recorders, or personal computers.

Example embodiments may also comprise a method for data streaming, comprising receiving a plurality of streaming requests, including mode requests, from a plurality of user devices, the method further comprising storing media data in the form of a plurality of payload data sets in a memory unit, setting a mode in accordance with each one of the mode requests, streaming the payload data sets in accordance with the set modes, and receiving from the memory unit a plurality of control data sub-sets, each comprising at least two edit portions, each comprising data corresponding to an address in the memory unit. Preferably, the method comprises receiving from the memory-unit a first sub-set of a first payload data set, and a first sub-set of the control data set, which first control data sub-set comprises a first edit portion comprising data corresponding to a location in the memory unit of a second sub-set of the first payload data set, and a second edit portion comprising data corresponding to a location in the memory unit of a third sub-set of the first payload data set. Preferably, the first sub-set of the payload data set and the first sub-set of the control data set are stored at the same location in the memory unit. Preferably, the memory unit comprises a plurality of memory sectors, and wherein the payload data sets and the control data sets are each arranged in pairs of payload data sub-sets and control data sub-sets, each pair being stored in a respective of the memory sectors. Preferably, the method comprises receiving the payload data sets from at least one data source, and pre-processing the payload data sets before being stored. Preferably, the method comprises dividing a payload data set into a plurality of payload data sub-sets, and creating for each of at least some of the payload data sub-sets a control data sub-set. Preferably, the method comprises locating a plurality of identification data groups within a payload data set, and providing in each of a plurality of the edit portions of the control data sub-sets data corresponding to the location of an identification data group. Preferably, each identification data group corresponds to a full image data frame.

Example embodiments may also comprise an apparatus, comprising a streaming unit configured to retrieve media data from a memory unit and provide portions of the media data to a user device, a control unit configured to accept a plurality of streaming requests and mode requests from a plurality of user devices, and state device, operably coupled to the streaming unit and the control unit, configured to set a set mode in accordance with each ones of the mode requests, whereby the streaming unit provides the portions of the media data to the user device in accordance with the set mode. Preferably, the streaming unit is further configured to stream the portions of the media data using control data, whereby the control data includes memory locations related to the portions of the media data. Preferably, the apparatus comprises a user device request unit configured to receive the plurality of streaming requests and mode requests from the user devices and transmit the plurality of streaming requests to the streaming unit and the mode requests to the state device. Preferably, the streaming unit provides the portions of the media data to the user device in accordance with one of a fast forward, a replay, a play, or a rewind corresponding to the set mode.

Example embodiments may also comprise a method, comprising retrieving media data from a memory unit, accepting a plurality of streaming requests and mode requests from a plurality of user devices, setting a set mode of a state machine in accordance with each ones of the mode requests, selecting portions of the media data under the control of the set mode of the state machine, and streaming the selected portions of the media data to a user device of the plurality of user devices. Preferably, streaming the selected portions of the media data is further configured in accordance to control data and whereby the control data includes memory locations related to the selected portions of the media data. Preferably, streaming the portions of the media data corresponding to the set mode of the state machine results at the user device in one of a fast forward, a replay, a play, or a rewind.

DESCRIPTION OF THE FIGURES

FIG. 9 is a diagram showing correlation between data stream request frequency and band width requirements, and FIG. 10 is a diagram showing correlation between payload data sets and data stream request frequency.

DETAILED DESCRIPTION

Figure 1:
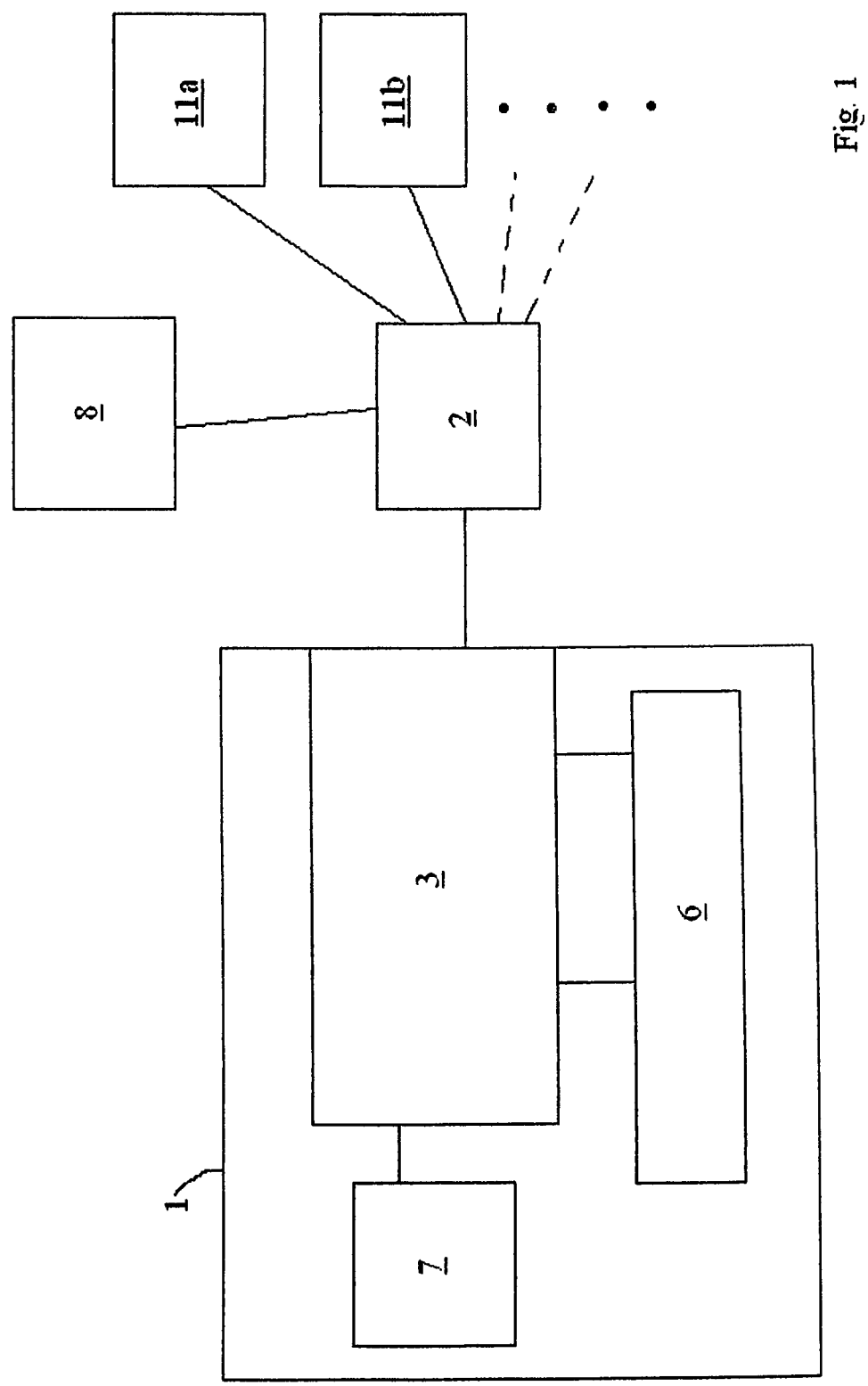
FIG. 1 is a block diagram of a data network and devices connected thereto including a data streaming device according to one embodiment of the invention, FIG. 2 block diagram of the data streaming device in FIG. 1.

FIG. 1 depicts schematically a system with an apparatus for data streaming, herein also referred to as a data streaming device 1 for data streaming, connectable to a data network 2, e.g., in the form of an IP-network. The network can alternatively be any kind of network, global or local, suitable for transporting data. Here data refers to information in a form that can be used by a computer, router or any other component of a communications system, and it can include text, numbers, sounds, pictures, and combinations thereof.

A plurality of user devices 11a, 11b are also connectable to the network 2. The user devices 11a, 11b can be any kind of remote devices adapted to receive media data, such as set-top boxes, personal video recorders, personal computers, or any combination thereof.

An embodiment of the data streaming device 1 comprises a streaming unit 3, a control unit 6, and memory unit 7, being connected to each other in a manner described closer below. As also described closer below, an embodiment of the control unit 6 comprises a processor (CPU) and a solid state memory, and is adapted to process data according to software programs, including pre-processing of media data, here also referred to as media payload data, or payload data. The memory unit 7 may be a solid state memory unit adapted to store media payload data. The streaming unit 3 is adapted to read in the memory unit 7, edit and schedule data to be streamed, and send data streams to the user devices 11a, 11b via the network 2. The logic functions of the streaming unit may be carried out by one or more programmed logic devices, i.e. hardware units, as described closer below.

Figure 2:
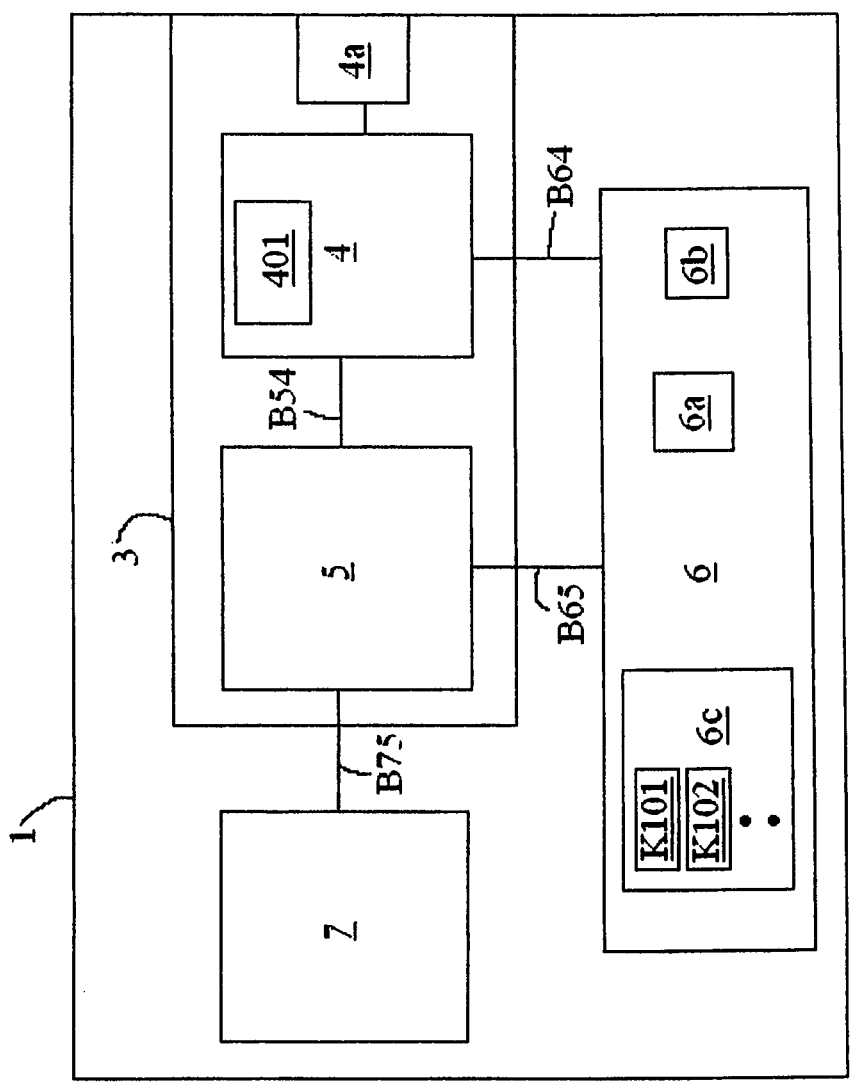

Reference is made to FIG. 2. In this embodiment, the streaming unit 3 of the data streaming device 1 comprises a networking unit 4, adapted to send and receive data to and from, respectively, the network 2, via a network interface 4a. The streaming unit 3 also comprises an editing unit 5 connected to the networking unit 4 by a suitable bus B54. The editing unit 5 is connected to the memory unit 7 by a bus B75. The editing unit 5 and the networking unit 4 are connected to the control unit by a respective bus B65, B64, such as a PCI (Peripheral Component Interconnect) bus.

In an example embodiment, the networking unit 4 and the editing unit 5 may be hard wired (i.e. hard-coded) with each of them comprising a programmed logic device in the form of a field programmable gate array (FPGA). Alternatively, any other suitable type of programmed logic device, or customized hardware can be used, such as CPLD (Complex Programmable Logic Device), ASIC (Application Specific Integrated Circuit) or gate array.

The memory unit 7 is adapted to store a plurality of sets of payload data, e.g., in the form of multimedia sequences, for example movies, music files, and/or advertisements. More generally, the payload data can be any form of media data, whether audio, visual, text or code, provided separately or in any combination. Also, a set of payload data, herein also referred to as a payload data set, can provide data for a time limited media display, or be received from a continuous flow of data, for example in the form of a transmission from a TV station. In an example embodiment the memory unit 7 comprises a solid state memory in the form of a plurality of interconnected so-called flash memory units, i.e. in-circuit programmable non-volatile memories segmented into memory sectors, and is described closer below. Instead of flash memory, any other suitable type of memory can be used, for example a DRAM or an SRAM.

Using a solid state memory creates several advantages over conventional hard-drives in streaming applications. An important limiting factor with conventional hard drives is that they provide a speed of information handling (i.e., extraction from storage) that is too low for large scale streaming application, due to, among other things, physical constraints of moving parts. Also, hard drives have a dependability which is less than desired for a good quality of service to users of data streaming services. In addition, hard drives have a high power consumption. In contrast to hard drives, certain solid state memories, specially flash memories, provide a speed of information handling which is more suitable for large scale streaming applications, due to the absence of moving parts, a significantly improved dependability, and a much lower power consumption.

Figure 3:
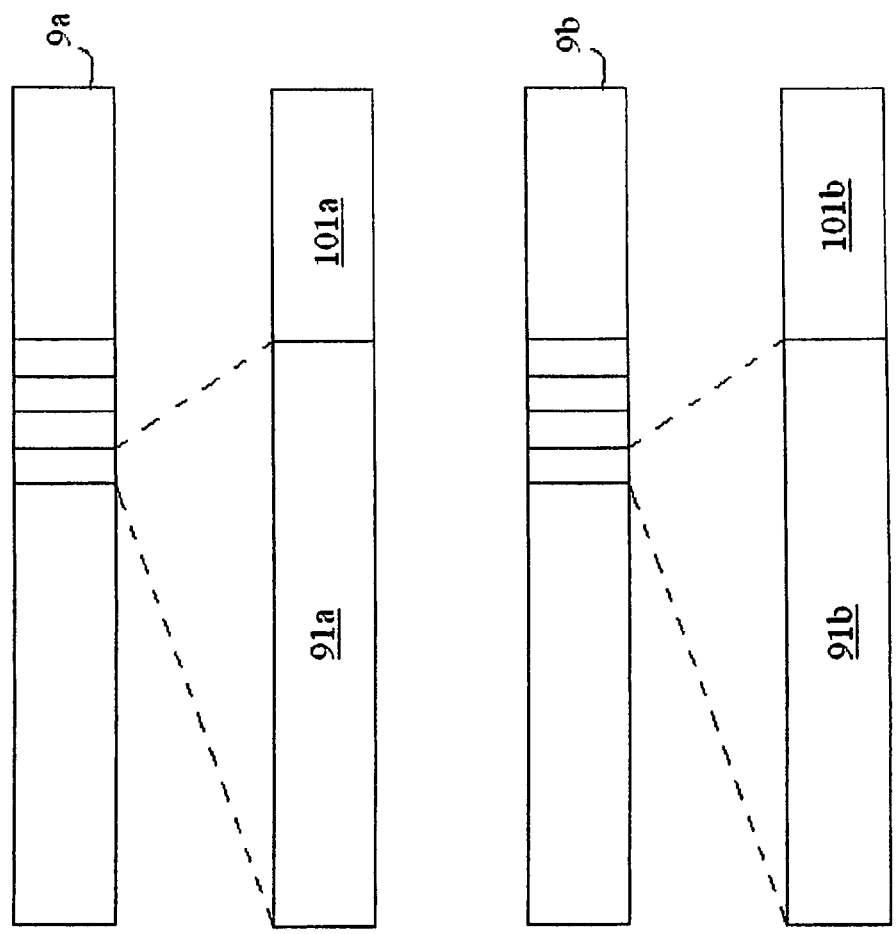
FIG. 3 is an illustration of data sets in the data streaming device in FIG. 2.

The sets of payload data can be received by the data streaming device 1 from a data source in the form of a remote server 8 via the network 2 and the network interface 4a. Referring to FIGS. 2 and 3, more specifically, the networking unit 4 is adapted to receive payload data sets 9a, 9b, for example motion picture videos, via the network interface 4a. It should be noted that, besides a server 8, the streaming device 1 can be adapted to receive the payload data sets from any type of data storing and/or transmitting device. Also, in the embodiment presented in FIG. 1, the same network 2 is utilized for all network transmissions involving the streaming device 1. Alternatively, separate networks can be used for receiving data from the remote server 8 and for sending data to the user devices 11a, 11b. Also, the streaming device 1 can alternatively be provided with more than one network interface 4a. Embodiments of the networking unit 4 may be hard coded to detect the incoming traffic of payload data sets 9a, and, in response to such detection, forward it to the control unit 6, which is adapted to store it temporarily in a control unit storage means 6a, which can be provided in the form of a RAM-memory, for example. It should be noted that the network 2 does not necessarily need to connect both the remote server 8 and the user devices 11a, 11b, e.g., the connections may be private and/or use different protocols.

The control unit 6 is adapted to pre-process sets of payload data, according to an example embodiment. Referring to FIG. 3, the control unit 6 is adapted to divide, in the pre-processing, each set of payload data 9a, 9b into a plurality of payload sub-sets 91a, 91b. The payload data sub-sets 91a, 91b may be adapted to the size of the memory sectors of the flash memories of the memory unit 7. Therefore, apart from the sequence of data within the payload, the division of the payload data into sub-sets need not depend upon the arrangement of payload data in view of the playback thereof. For example, in the case of the payload data being a video, depending on the size of the memory sectors, each sub-set 91a of payload data can include data for a sequence of video frames, or only a part of such a frame.

The control unit 6 may be adapted to create, in the pre-processing of the payload data 9a, 9b, control data, here also referred to as side information. More specifically, the control unit 6 is adapted to create, in the pre-processing of each payload data set 9a, 9b, a set of control data. Each control data set is related to the respective payload data set and includes data for linking the payload data sub-sets 91a, 91b, or parts thereof, when streaming the respective payload data set 9a, 9b to users. As will be described further below, in the case of a video, the linking data is such that it allows the streaming to be carried out in accordance with any of a number of playback modes, herein also simply referred to as modes, for example normal viewing mode, four fast forwarding modes with respective individual speeds, and four reverse modes with respective individual speeds.

Referring to FIG. 3, each set of control data is typically provided in the form of control data sub-sets 101a, 101b, each associated with a respective payload data sub-set 91a, 91b. The size of each pair of payload data sub-set 91a, 91b and control data sub-set 101a, 101b is adapted for occupying a respective memory sector of the flash memory units of the memory unit 7.

In an example embodiment, the control unit 6 is adapted to locate, in the pre-processing, a plurality of identification data groups within a payload data set 9a, 9b, and provide in each of a plurality of edit portions, further described below, of the control data sub-sets 101a, 101b, data corresponding to the location of an identification data group. Each identification data group corresponds to a full data frame, such as a full image data frame, e.g., a frame that does not include any reference to previous or other frames for their composition. More specifically, videos can be compressed or coded, for example by MPEG-2, and the user devices 11a, 11b can be adapted to decode them. In MPEG-2, full image data frames are referred to as I-frames (intra coded frames). The identification of locations of full image data frames makes it possible to provide, as described closer below, for only such full image data frames to be streamed in compressed videos and at higher playback speeds. Thus, at the pre-processing of the video in the control unit 6, software is used to identify the I-frames to obtain the linking structures of the control data set, according to an example embodiment. Alternatively, a hardware mechanism may be employed that performs a similar function.

It should be noted that the determination of locations of identification data groups can be performed on any media data, whether it is video, audio or of some other type, being in a format such that it contains such data groups, or data sequences, that have a function corresponding to that of the I-frames in the MPEG-2 format, i.e., serving to identify a portion of the media content without referring to other media data.

The control unit 6 is adapted to send, upon pre-processing, the pairs of payload data sub-sets 91a and control data sub-sets 101a to the editing unit 5, which is adapted to forward them for storage in respective memory sectors of the memory unit 7. More specifically, referring to FIGS. 2 and 4, (FIG. 4 being a block diagram depicting functions of the editing unit 5), the control unit 6 is adapted to send the payload data and the control data via the bus B65 to the editing unit 5, which is adapted to forward it to the memory unit 7 via the bus B75, as indicated by the arrow 14 in FIG. 4.

Alternatively, the control unit 6 can be adapted to send the payload data and control data directly to the memory unit 7, for example via a bus (not shown) between the two units 6, 7.

In this manner, a large number of payload data sets can be received by the data streaming device 1, pre-processed by the control unit 6, and stored in the memory unit 7.

Reference is made to FIG. 1. The data streaming device 1 is adapted to receive streaming requests, herein also referred to simply as requests, via the network 2 from a plurality of user devices. It should be noted that the data streaming device according to a preferred embodiment of the invention is, when used in practice, able to store, e.g., with a storage capacity of 1.5 TBytes, a large amount of payload data sets, e.g. corresponding to 460-1000 hours of video content, and to work simultaneously with requests from up to 10000 user devices. Here, for reasons of simplicity of the presentation, only a first and a second user device 11a, 11b are shown in FIG. 1.

Referring to FIG. 2, the networking unit 4 is adapted to receive, via the network interface 4a, from user devices 11a, 11b requests, including playback mode requests, for sets of payload data 9a, 9b. The networking unit is adapted to forward the user device requests to the control unit 6, to be treated by a user request unit 6b, which is adapted to read the requests according to a protocol for media streaming requests, such as RTSP (Real Time Streaming Protocol). The user request unit 6b is adapted to process the requests, each including the identity of the respective user device 11a, 11b, the respective set of payload data 9a, 9b and respective the playback mode request, so as to be adapted to a streaming device internal language format, and send them to the editing unit 5. The user request unit 6b is also adapted to extract from the requests sets of request data, each including the identity of the network protocol used for the respective request, and a network address of the respective user device 11a, 11b. The user request unit 6b is further adapted to send the extracted sets of request data to the networking unit 4 to be stored in networking unit storage means in the form of a RAM memory 401.

It should be mentioned that alternatively, the streaming unit 3 can be hard-coded to process requests, so as for the requests to be adapted to a streaming device internal language format.

Figure 4:
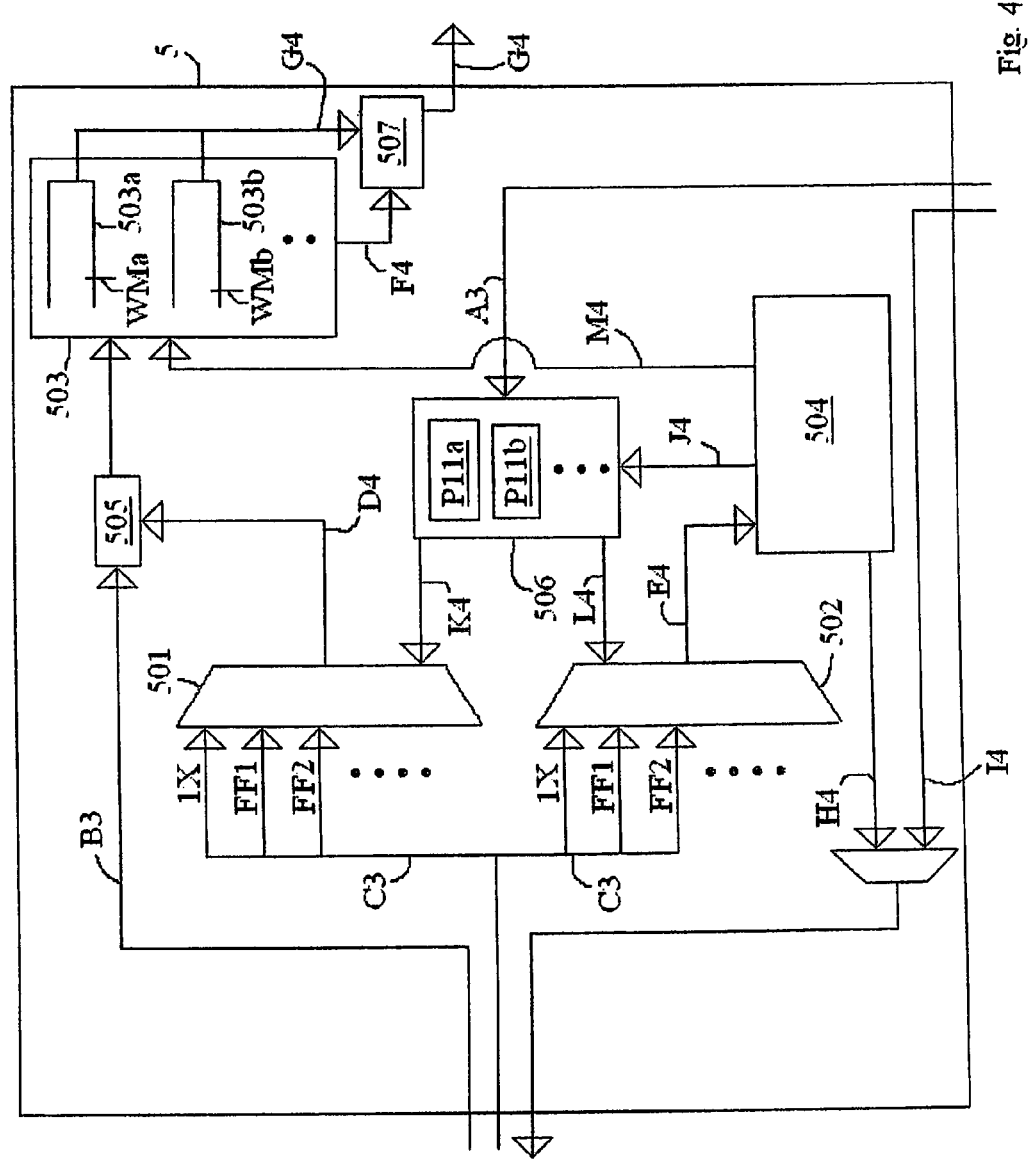
FIG. 4 is a block diagram of a part of the data streaming device in FIG. 2.

Referring to an example embodiment shown in FIG. 4, the editing unit 5 comprises a user status memory 506, herein also referred to as a state device 506, adapted to receive, as indicated by the arrow A3, from the control unit 6 information corresponding to user requests, received by the streaming device 1 as described above. Specifically, the user status memory 506 is adapted to receive the requests including the identities of the user devices 11a, 11b and the playback mode requests P11a, P11b of the user devices 11a, 11b, according to an embodiment of the invention. The information about the identity of the user devices 11a, 11b, the requested payload data sets 9a, 9b and the playback mode requests may be stored in the user status memory 506.

Alternatively, the user status memory 506 can be provided as a unit, for example including a data table, separate from the streaming unit 3 and the control unit 6.

Further, the editing unit 5 comprises a first and a second multiplexer 501, 502, each adapted to receive from the memory unit 7 control data sub-sets 101a, 101b (see FIG. 3), as indicated by the arrows C3 in FIG. 4, according to an embodiment of the invention. The editing unit 5 may also comprise a trimming device 505, adapted to receive from the memory unit 7 payload data sub-sets 91a, 91b (see FIG. 3), as indicated by the arrow B3 in FIG. 4, as well as a pacing device 504 and a scheduling device 507, described further below.

Figure 5:
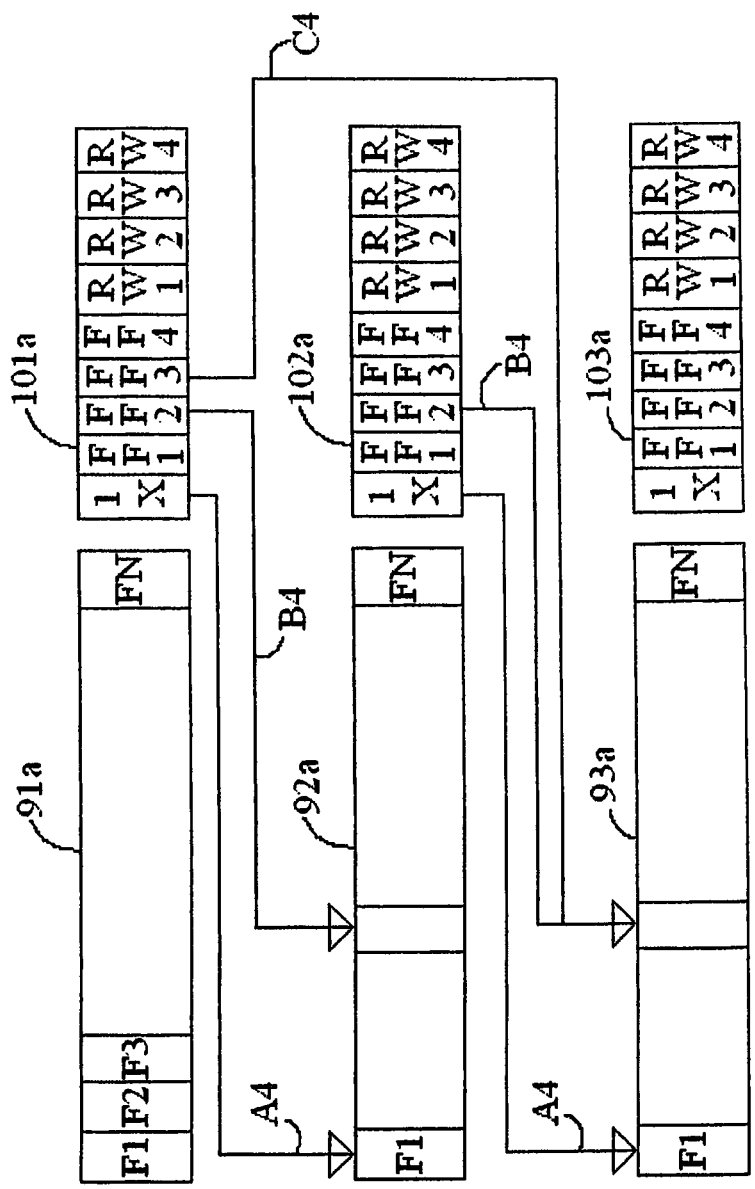
FIG. 5 is an illustration of data sub-sets handled by the part depicted in FIG. 4.

As stated, the sets of payload data 9a, 9b, requested by the user devices 11a, 11b can be videos. FIG. 5 shows an example embodiment with three payload data sub-sets 91a, 92a, 93a, one following another in a normal viewing playback mode of the video. The control data set may provide a linking structure for each playback mode that can be requested, e.g normal viewing speed 1×, and "trick-play modes". The trick-play modes can include fast forward modes and fast reverse modes. In one embodiment there is a first, second, third and fourth fast forward mode FF1, FF2, FF3, FF4, each providing an individual playback speed, and a first, second, third and fourth fast reverse mode RW1, RW2, RW3, RW4, each providing an individual playback speed. Each payload data sub-set 91a, 92a, 93a contains a number of picture frames F1, F2, F3 . . . FN. At normal playback speed of the video 1×, the linking structure provides for all frames within a payload data sub-set 91a, 92a, 93a to be streamed, and for the first frame F1 in a payload data sub-set to be streamed after the last frame FN of a another payload data sub-set, as indicated in FIG. 5 by the arrows A4.

At a higher playback speeds FF1, FF2, FF3, FF4, RW1, RW2, RW3, RW4, the linking structure indicates which of the frames are to be streamed, according to an embodiment of the invention. For example, after a frame which is not the last in a payload data sub-set, a frame in another payload data sub-set can be streamed, as indicated in FIG. 5 by the arrows B4. Also, the subsequent frame can be included in a payload data sub-set which does not follow immediately in a normal viewing playback mode, as indicated in FIG. 5 by the arrow C4.

As stated above, according to an example embodiment, in compressed videos and at higher playback speeds only frames that do not include references to previous frames for their composition (I-frames) are streamed. In one embodiment, at the first fast forward mode FF1 and the first fast reverse mode RW1 every I-frame is streamed to the user devices, and at the second fast forward mode FF2 and the second fast reverse mode RW2 every I-frame is streamed to the user devices, and so on.

In addition, the streaming device 1 can be adapted to receive a playback request for a pause mode, i.e. the presentation of a video being frozen so that a non-moving image is shown. Thereby, the streaming unit 3 can be adapted to stream repeatedly the same I-frame to the user device in question. Alternatively, the user device 11a, 11b can be adapted to store an I-frame at a pause request from a user, so that the I-frame is shown to the user for an extended period of time.

The size of the payload data sub-sets 91a, 92a, 93a are adapted to the size of the memory sectors in the memory unit 7, according to an example embodiment. If the size of each of these memory sectors is relatively small, e.g. 16 kB, the data composing a frame in a video, for example an I-frame according to the MPEG-2 format, can be larger than the memory sector size. (Typically the data for an I-frame can be 64 kB or more.) In such a case, the frame data will simply use two or more memory sectors, and the linking structure of the control data set will provide a proper sequence of the memory sectors storing parts of the same frame. An advantage with providing relatively small memory sectors is that in trick-play modes, compared to a case with relatively large memory sectors, the amount of data cut away by the editing unit 5, as described closer below, will be less.

As described further below, the control data sub-sets also provides addresses to memory sectors in the memory unit 7 storing subsequent sub-sets of payload data, depending on the playback mode requested.

Referring to FIGS. 4 and 5, in an example embodiment, the editing unit 5 is adapted to, upon receiving the data corresponding to the identity of a user device 11a, 11b, the identity of a set of payload data 9a, 9b, and a playback mode request P11a, P11b, retrieve a first sub-set 91a, 91b of the requested payload data set 9a, 9b, as well as a first sub-set 101a, 101b of the control data set. In the pre-processing described above, the control unit 6 is adapted to store the address in the memory unit 7 of the first subset 91a, 91b of each payload data set 9a, 9b, i.e. in the case of a video, the data for the beginning of the video. The control unit 6 is further adapted to, upon a user request for a payload data set 9a, 9b to retrieve the memory unit 7 address of the first subset 91a, 91b of the payload data set 9a, 9b, and to send this memory unit address to the editing unit with other data regarding the user request. The user status memory 506 is adapted to receive the first memory unit address and to forward it to the pacing device 504, which is adapted to send a request to the memory unit 7 for retrieving the first sub-set 91a, 91b of the requested payload data set 9a, 9b, as well as a first sub-set 101a, 101b of the control data set.

The trimming device 505 is adapted to receive from the memory unit 7 payload data subsets 91a, 91b upon requests from the pacing device 504. The first and second multiplexers 501, 502 are adapted to receive control data sub-sets 101a, 101b, upon requests from the pacing device 504, according to an example embodiment.

The user status memory 506 is adapted to receive periodically from the pacing device 504 data, as indicated by the arrow J4 in FIG. 4, corresponding to information regarding the user device, i.e. stream, for which a read request is currently being sent to the memory unit 7. The user status memory 506 may comprise a plurality of rows, each corresponding to one stream according to a user request P11a, P11b, and controls the multiplexers 501, 502 for filtering the control data in accordance with the playback modes of the respective user requests. Thus, the user status memory 506 is adapted to send, in response to the stream identity information J4 from the pacing device 504 control signals, indicated by the arrows K4, L4 in FIG. 4, so as to adjust the setting of the multiplexers to the playback mode (1×, FF1, . . . ) of the stream currently being served.

Thus, according to an example embodiment, the first multiplexer 501 is adapted to receive control data sub-sets 101a, 101b, and, in dependence on the control of the user status memory 506 concerning the requested playback mode P11a, P11b, extract an edit portion of each sub-set 101a of control data, which edit portion gives linking information for the requested playback mode P11a, P11b. As indicated by the arrow D4 in FIG. 4, the edit portions of the control data sub-sets 101a, 101b are used to read in the trimming device 505, so that a data sequence according to the linking structure of the respective edit portion of the control data sub-sets 101a, 101b is sent to an output buffer 503a, 503b of an output memory 503.

The output memory 503 is preferably a large solid state memory, which in practice can be a 512 MB DRAM, or alternatively some other kind of random access memory, e.g. SRAM, according to an embodiment of the invention. The output memory 503 is arranged so as to provide a plurality of output buffers 503a, 503b, in the form of FIFO (first-in, first-out) queues, corresponding to the plurality of user devices 11a, 11b to which data streaming is carried out. Similarly to the user status memory 506, the output memory 503 is adapted to receive periodically from the pacing device 504 data, as indicated by the arrow M4 in FIG. 4, corresponding to information regarding the user device, i.e. stream, for which a read request is currently being sent to the memory unit 7. Based on this information, an output buffer 503a, 503b is identified for receiving the edited contents of the trimming device 505.

The second multiplexer 502 is also adapted to receive the control data sub-sets 101a, 101b, and to extract, in dependence of the user status memory control, a edit portion of each control data sub-set 101a, 101b, according to an embodiment of the invention. As described further below, each extracted edit portion gives the address in the memory unit 7 of a subsequent payload data sub-set 92a, 92b. As indicated by the arrow E4 in FIG. 4, each edit portion of the control data sub-sets 101a, 101b is received by the pacing device 504.

Alternatively, it is possible to replace the first and second multiplexer 501, 502 with other devices, such as only one multiplexer, the output of which is sent to the trimming device 505 as well as the pacing device 504.

In the example here, there is one data path from the memory unit 7 to the editing unit 5, so that sub-sets of data are read for one of the individual user device streams at the time in a manner serving the individual user device streams in a cyclic manner, (see further below). However, in practice, several parallel data streams could be provided from the memory unit 7 to the editing unit 5.

The scheduling device 507 is adapted to determine the timing of data outputs from the output memory 503. As indicated by the line F4 in FIG. 4, the scheduling device 507 is adapted to read from data traffic from the output buffers 503a, 503b of the output memory 503 information based on which a bit-rate or a pace, at which the respective payload data sets 9a, 9b are to be displayed, can be determined. More specifically, the bit-rate information is determined from known time codes, for example PCR (programme clock reference), used in multimedia display methods, and included in the sets of payload data. The bit-rates corresponding to the respective time codes can differ from one payload data set 9*a* to another 9*b*. Thus, the bit-rate of data streamed can differ from one output buffer 503*a* to another output buffer 503*b*.

The scheduling device 507 is adapted to control the data traffic from the output buffers 503*a*, 503*b* to the networking unit 4, as indicated by the arrow G4 in FIG. 4, in dependence on the bit-rate information for each stream. The data from each output buffer are sent in stream portions, the size of which is adapted to network requirements (e.g. in the order of 1.5 kB). More specifically, the scheduling device 507 is adapted to determine a bite-rate based on time codes in the payload data stream, as mentioned above. The stream in question is sent based on this determined bit-rate, and when a further time code is detected, the determined bit-rate is compared to time information from a clock, and the scheduling device 507 is adapted to adjust, based on this comparison, the timing of data sent in the stream. If it is determined that a stream portion of data from one output buffer 503*a*, 503*b* should not be sent, the scheduling device 507 makes a similar determination concerning the another output buffer 503*a*, 503*b*, and works in this respect as a scheduler, performing a cyclic sequence of determinations whether to send stream portions of data from the respective output buffets 503*a*, 503*b* to the networking unit 4.

In addition, or alternatively, such determination of the bit-rate information or display pace information can be done at the above-described pre-processing of the payload data set 9*a*, 9*b*, in the control unit 6, and included in the control data set corresponding to the payload data set 9*a*, 9*b*.

The network unit 4 is adapted to receive stream portions from the respective output buffers 503*a*, 503*b*, as well as information identifying the respective output buffer 503*a*, 503*b*, and to create data packets based on the stream portions from the output buffers 503*a*, 503*b* and the request data sets stored in the networking unit storage means 401. Thereby, the respective output buffer identification provides, or corresponds to an address in the networking unit storage means 401 of the corresponding request data set. The network unit 4 is further adapted to send the data packets to the user devices 11*a*, 11*b* via the network interface 4*a*. Thus, network data packets are created as the data is streamed by the streaming device 1.

Reference is made to FIGS. 4 and 5. According to an example embodiment, in a similar manner to the cyclic sequence of determinations performed by the scheduling device 507 whether to send stream portions of data from the respective output buffets 503*a*, 503*b* to the networking unit 4, the pacing device 504 is adapted to make a cyclic sequence of determinations regarding the data streams whether to send further read requests to the memory unit 7, and works in this respect as a scheduler for read instructions to the memory unit 7. As indicated in FIG. 4, each output buffer 503*a*, 503*b* is provided with a respective threshold level WMa, WMb in the respective FIFO queue. When determining whether to request more data for a specific output buffer 503*a*, 503*b*, the pacing device 504 is adapted to compare the amount of data temporarily stored in the output buffer to the respective threshold level WMa, WMb, and to request more data from the memory unit 7 if the amount of data stored is below the respective threshold level WMa, WMb. Thereby, as indicated by the arrow H4 in FIG. 4, based on the memory sector addresses in the control data sub-sets 101*a*, 101*b*, the pacing device 504 sends to the memory unit 7 read requests for further payload data sub-sets 92*a*, 92*b* and a further control data sub-sets 102*a*, 102*b*. Subsequent sub-sets 92*a*, 92*b*, 102*a*, 102*b* are received by the trimming device 505 and the multiplexers 501, 502, and data is forwarded to the respective output buffer 503*a*, 503*b*, in a manner corresponding to what has been described above.

It should be noted that the threshold levels WMa, WMb can be set individually and differently for the output buffers 503*a*, 503*b*, or to be the same for a group of output buffers or for all output buffers.

During steaming of payload data, the networking unit 4 can receive a request from a user device for an alternative playback mode. The streaming device 1 is adapted to change the playback mode setting P11*a* for a user device 11*a*, 11*b* if the user device 11*a*, 11*b* requests an alternative playback mode, for example a trick-play mode, e.g., fast forward or fast reverse. More specifically, according to an embodiment of the invention, if the networking unit 4 receives, via the network interface 4*a*, from a user device 11*a*, 11*b* a request for an alternative playback mode, the networking unit 4 is adapted to forward the request to the control unit 6, which is adapted to treat the request in a manner corresponding to what has been described above. The control unit 6 is adapted to send the request to the editing unit 5. In the editing unit 5, the user status memory 506 receives the request including the identity of the user device 11*a*, 11*b* in question, and stores the data corresponding to the requested alternative playback mode.

Referring to FIGS. 4 and 5, in trick-play modes, similarly to what has been described above, the editing unit 5 is adapted to retrieve, upon read instructions (H4) from the pacing device 504, payload data sub-sets 91*a*, 91*b*, as well as control data sub-sets 101*a*, 101*b*. Thereby, the trimming device 505 is adapted to receive and temporarily store the payload data sub-sets 91*a*, 91*b*. The first multiplexer 501 is adapted to receive control data sub-sets 101*a*, 101*b* and extract an edit portion of each of them in accordance with the requested trick-play mode P11*a*, P11*b*, which edit portions gives linking information for the requested trick-play mode P11*a*, P11*b*, (see also below with reference to FIG. 6). As indicated by the arrow D4 in FIG. 4, the edit portions of the control data sub-sets 101*a*, 101*b* is used to read in the trimming device 505, so that a data sequence according to the linking structure of the respective edit portions is sent to the respective output buffers 503*a*, 503*b* of the output memory 503.

Thus, referring to FIGS. 4 and 5, upon reception in the trimming device 505 of a payload data sub-set 92*a*, 92*b*, the linking structure provided by an edit portion of the control data sub-set 101*a*, 101*b*, which edit portion corresponds to the requested trick-play mode P11*a*, P11*b*, is used to extract a trimmed portion of the payload data sub-set 92*a*, 92*b* to be sent to the output buffer 503*a*, 503*b* for the stream in question. Parts of the payload data sub-set 92*a*, 92*b* excluded in the trimming device by the linking structure are simply deleted from the stream.

In fast trick-play modes of videos, preferably the linking structure of the control data sub-set is such that only full image data frames, i.e. frames that do not include references to previous frames for their composition, e.g. I-frames in MPEG-2, are sent to the output buffers 503*a*, 503*b*. In compressed videos and at higher playback speeds only so called I-frames (intra coded frames), i.e., are streamed, according to an embodiment of the invention. At the pre-processing of the video in the control unit 6, a software is used to identify the I-frames to obtain the linking structures of the control data set, as described closer below.

As understood from the presentation above, according to an example embodiment, a trick-play linking structure of a control data set provides for a separate addressing sequence in the memory unit 7, followed upon read instructions by the pacing unit 504, so that memory sectors that would have been included in a normal viewing speed play mode might be "skipped".

At trick-play modes, the scheduling device 507 is adapted to determine the timing of the outputs from the respective output buffer 503a, 503b, based on respective bit-rates at normal viewing speeds 1×, in turn determined from time codes as described above. Thus, at a trick-play mode, a payload data set will be streamed to a user device at a bit-rate being the same as that at which it is streamed at a normal viewing speed mode 1×. Alternatively, the bit-rate at trick-play modes can be predetermined individually for the payload data sets, or for groups of payload data sets, or collectively for all payload data sets.

Figure 6:
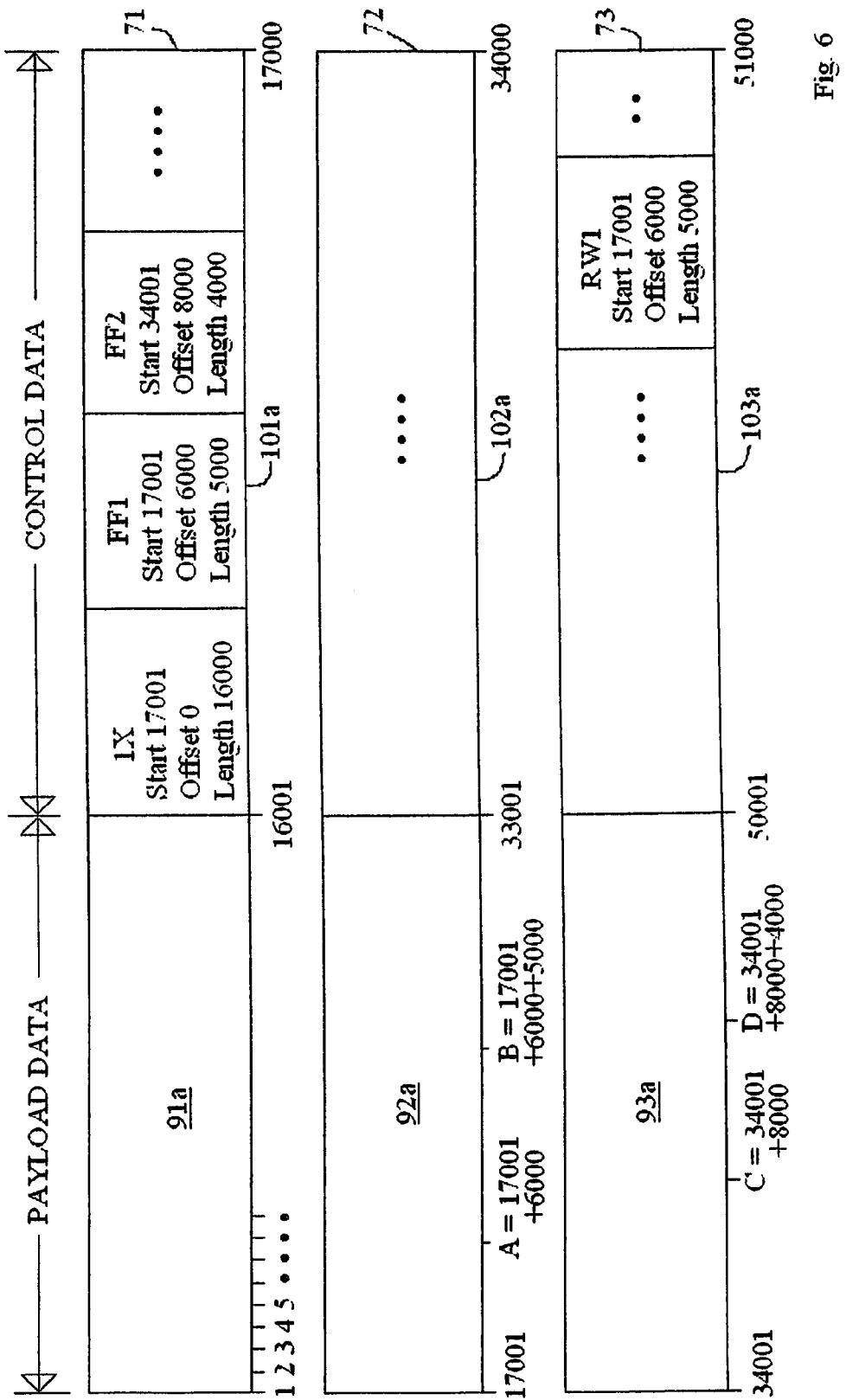
FIG. 6 is a block diagram of memory sectors in a memory unit in the data streaming device in FIG. 2.

Reference is made to FIG. 6, showing an example of how memory sector locations in the memory unit 7 are accessed, according to an example embodiment. Three pairs of payload data sub-sets 91a, 92a, 93a and control data sub-sets 101a, 102a, 103a are in this example stored in consecutive first, second and third memory sectors 71, 72, 73 of the memory unit 7. In all memory sectors, the memory space available for payload data and control data is the same, in this example 16000 bytes and 1000 bytes, respectively.

Assuming that the playback mode of the current user device request is normal viewing speed (1×), after having retrieved data from the first memory sector 71, the editing unit 5 determines from the first edit portion (1x) of the first control data sub-set 101a the memory address (17001) of the start of the next memory sector 72. The editing unit 5 also determines from the first edit portion (1x) of the first control data sub-set 101a that the offset from the start of the second payload data subset 92a is 0 bytes and the length within the subset 92a of the data to be streamed is 16000 bytes, which means that the output buffer 503a (FIG. 4) for the stream in question will receive all data in the second payload data subset 92a.

Assuming differently that the playback mode of the current user device request is the first fast forward mode FF1, after having retrieved data from the first memory sector 71, the editing unit 5 determines from a second edit portion (FF1) of the first control data sub-set 101a the memory address (17001) of the start of the next memory sector 72. The editing unit 5 also determines from the second edit portion (FF1) of the first control data sub-set 101a that the offset from the start of the second payload data subset 92a is 6000 bytes and the length within the subset 92a of the data to be streamed is 5000 bytes, which means that the output buffer 503a (FIG. 4) for the stream in question will receive all data in the interval [A, B] in FIG. 6. Alternatively, assuming that the playback mode of the current user device request is the second fast forward mode FF2, after having retrieved data from the first memory sector 71, the editing unit 5 determines from the third edit portion (FF2) of the first control data sub-set 101a the memory address (34001) of the start of the next memory sector 73, which means that a memory sector 72 read in normal viewing speed playback mode (1×) is skipped. The editing unit 5 also determines from the third edit portion (FF2) of the first control data sub-set 101a that the offset from the start of the third payload data subset 93a is 8000 bytes and the length within the subset 93a of the data to be streamed is 4000 bytes, which means that the output buffer 503a (FIG. 4) for the stream in question will receive all data in the interval [C, D] in FIG. 6.

The editing unit 5 and the memory unit 7 are arranged so that at each data retrieval step, the respective control data subsets 101a, 102a, 103a are read in their entirety. Thus, all data between a predetermined offset location, in this example 16001 bytes, from the start location of the respective memory sector 71, 72, 73 to the end of the memory sector, is retrieved.

To illustrate the memory access sequence in a reverse playback mode, according to an example embodiment, FIG. 6 shows an edit portion of a third control data subset 103a giving local linking information for the first fast reverse playback mode RW1. After having retrieved data from the third memory sector 73, the editing unit 5 determines from the edit portion (RW1) of the third control data sub-set 103a the memory address (17001) of the start of the next memory sector 72, which would have preceded the third sector 73 in normal viewing playback mode streaming. The offset value (6000) and the length value (5000) are used in a manner corresponding to what has been described above with reference to FIG. 6 concerning forward playback modes.

In the example presented with reference to FIG. 6, the edit portions of the control data sub-sets 101a, 102a, 103a are described as pointing to the start of the next memory sector 71, 72, 73 to be read for the stream. However, different ways of identifying the next memory sector 71, 72, 73 can be used. For example, a position in the middle of the next memory sector 71, 72, 73 can be identified, possibly combined with a local pointer within the next memory sector 71, 72, 73.

Having described the streaming device above, an example of a method in the streaming device 1 will be described, according to an embodiment of the invention.

Referring to FIGS. 2 and 3, a first set of payload data 9a, for example a first motion picture video, is received by the networking unit 4 via the network interface 4a. The networking unit 4 detects the incoming traffic of the first set of payload data 9a and forwards it to the control unit 6.

Referring to FIG. 3, in the pre-processing, the first set of payload data 9a is divided into a plurality of sub-sets 91a, and a first set of control data, in the form of sub-sets 101a of control data, is created, including data for linking the sub-sets 91a of payload data, or parts thereof. Upon pre-processing, the pairs of payload data sub-sets 91a and control data sub-sets 101a are sent to the editing unit 5, and then stored in respective memory sectors of the memory unit 7.

Further, a second set of payload data 9b is received by the networking unit 4, and forwarded to the control unit 6 to be pre-processed as described above. Thus, referring to FIG. 3, the second set of payload data 9b is divided into a plurality of sub-sets 91b, and a second set of control data in the form of sub-sets 101b of control data is created, and the pairs of payload data sub-sets 91a and control data sub-sets 101a, 101b are stored in respective memory sectors of the memory unit 7.

The networking unit 4 receives, via the network interface 4a, from a first user device 11a a first request, including a playback mode request, for the first set of payload data 9a. The networking unit 4 forwards the first request to the control unit 6, to be adapted to a streaming device internal language format, and the first request send to the editing unit 5. The control unit 6 extracts from the first request a first request data set, including the identity of the network protocol used for the first request, and a network address of the user device 11a, and sends the first request data set to the networking unit 4 to be stored in the RAM memory 401.

In this example the networking unit 4 also receives from the second user device 11b a first request, including a playback mode request, for the second set of payload data 9b, whereupon the first request, including the identity of the second user device 11b, the second set of payload data 9b and the playback mode request, is forwarded to the control unit 6, which extracts a first set of request data to be stored in the RAM memory 401, in the same manner as outlined above.

The user status memory 506 receives, as indicated by the arrow A3 in FIG. 4, from the control unit 6 data corresponding to the identity of the first user device 11a, the playback mode request P11a, as well as a memory unit address of the first subset 91a of the first payload data set 9a, provided as described above, which data is stored in the user status memory 506. The user status memory 506 forwards the memory unit address to the pacing device 504, which sends a request to the memory unit 7 for retrieving the first sub-set 91a of the first payload data set 9a, as well as the first sub-set 101a of the first control data set. Similarly, the user status memory 506 receives data corresponding to the identity of the second user device 11b, the playback mode request P11b, as well as a memory unit address of the first subset 91b of the second payload data set 9b, provided as described above, which data is stored in the user status memory 506. The user status memory 506 forwards the memory unit address to the pacing device 504, which sends a request to the memory unit 7 for retrieving the first sub-set 91b of the second payload data set 9b, as well as the first sub-set 101b of the second control data set.

In this example, initially, the playback mode request P11a of the first user device 11a is a request for a normal viewing speed (1×) of the video. The first sub-set 91a of payload data is sent to the trimming device 505, where it is temporarily stored. The first multiplexer 501 receives a first control data sub-set 101a, and extracts, in dependence on the control of the user status memory 506 concerning the requested playback mode P11a, a first edit portion of the first control data sub-set 101a, which first edit portion gives linking information for the requested normal viewing speed (1×). As indicated by the arrow D4 in FIG. 4, the first edit portion of the first control data sub-set 101a is used to read in the trimming device 505, so that the full sequence of data of the first payload data subset 91a is stored in a first output buffer 503a of the output memory 503.

The second multiplexer 502 also receives the first control data sub-set 101a, and extracts, in dependence of the user status memory control, a first edit portion of the first control data sub-set 101a, which first edit portion gives the address in the memory unit 7 of a second sub-set 92a of the first payload data set 9a. The first edit portion of the first control data sub-set 101a is received by the pacing device 504. Based on the playback mode request P11b of the second user device 11b, and a first edit portion of a first sub-set 101b of a second set of control data, a first subset 91b of payload data is stored in a second output buffer 503b.

In a manner described above, the scheduling device 507 determines first bit-rate information, or first display pace information, based on information in the first set of payload data 9a, and corresponding to a pace at which the first set of payload data 9a is to be displayed in the first user device 9a. Data from the first output buffer 503a is sent based on the first bit-rate information, and when a further time code in the first payload data set 91a is detected, the first bit-rate information is compared to time information from the clock, and based on this comparison the scheduling device 507 adjusts the timing of data sent from the first output buffer 503a. If it is determined that a stream portion of data from the first output buffer 503a should not be sent, the scheduling device 507 makes a similar determination concerning the second output buffer 503b, performing a cyclic sequence of determinations whether to send stream portions of data from the respective output buffets 503a, 503b to the networking unit 4.

After reception of a stream portion of data from the first output buffer 503a, in the networking unit 4 a data packet is created based on the stream portion of data and the first set of request data stored in the networking unit storage means 401, and the data packet is sent to the to the first user device 11a via the network interface 4a. Similarly, after reception of a stream portion of data from the second output buffer 503b, in the networking unit 4 a data packet is created based on the stream portion of data and the second set of request data stored in the networking unit storage means 401, and the data packet is sent to the to the second user device 11b via the network interface 4a.

As indicated by the arrow H4 in FIG. 4, in dependence, as described above, on the data level in the respective output buffer 503a, 503b, and based on the memory sector address in the first sub-set 101a of the first set of control data, the pacing device 504 sends to the memory unit 7 a read request for a second sub-set 92a of the first set 9a of payload data and a second sub-set 102a of the first set of control data. These sub-sets 92a, 102a are received by the trimming device 505 and the multiplexers 501, 502, and data is forwarded to the output memory 503, in a manner corresponding to what has been described above.

After starting of the data streaming to the first user device 11a, the first user device 11a requests the second fast forwarding speed of the video FF2, and the playback mode setting P11a for the first user 11a in the user status memory 506 will be changed. More specifically, the networking unit 4 receives, via the network interface 4a, from the first user device 11a a second request, including a playback mode request for the second fast forward mode FF2. The networking unit 4 forwards the second request to the control unit 6, to be treated by the user request unit 6b, and send to the editing unit 5. In the editing unit 5, the user status memory 506 receives the second request including the identity of the first user device 11a, which is stored in the user status memory 506.

Referring also to FIG. 5, using the same denomination for the data sub-sets as in the example above, upon a read instruction H4 from the pacing device 504, the editing unit 5 retrieves a first sub-set 91a of the first set of payload data 9a, as well as a first sub-set 101a of the first set of control data. The first sub-set 91a of payload data is sent to the trimming device 505, where it is temporarily stored.

The first control data sub-set 101a is received by the first multiplexer 501, which in dependence of the requested playback mode P11a, extracts a third edit portion of the first sub-set 101a of control data, which third edit portion gives linking information for the requested fast forward viewing speed (FF2), (see also below with reference to FIG. 6). As indicated by the arrow D4 in FIG. 4, the third edit portion (FF2) of the first sub-set 101a of control data is used to read in the trimming device 505, so that a data sequence according to the linking structure of the third edit portion (FF2) is sent to the first output buffer 503a of the output memory 503. Thus, referring to FIGS. 4 and 5, upon reception in the trimming device 505 of a second sub-set 92a of the first set of payload data 9a, the linking structure provided by the third edit portion (FF2), indicated by the arrow B4 in FIG. 5, is used to extract a trimmed portion of the a second sub-set 92a of the first set of payload data 9a to be sent to the first output buffer 503a. Parts of the first set of payload data 9a excluded in the trimming device by the linking structure are simply deleted from the stream.

It should be mentioned that embodiments of the invention allow a stream at fast speed playback modes to be "tailored" according to desires of a service operator. For example, the linking structure can be made so that commercials are shown at normal viewing speed, although fast speed has been requested by the user. More specifically, the fast speed linking structure (e.g. for FF3) can be made to coincide with a normal speed linking structure (1×), or a slower fast speed linking structure (e.g. for FF2).

The data streaming device can in practice be provided in a large number of example embodiments, varying from what has been described in the example above. For example, any of the functional units of the streaming device 1, such as the streaming unit 3, the editing unit 5, the networking unit 4, the memory unit 7 or the control unit 6, can be provided as a plurality of logically interconnected devices. Further, the editing unit 5 and the networking unit 4 can be provided as a physically integrated unit. In a further embodiment, the memory unit 7 can be provided as two or more separate units. One such memory sub-unit can be adapted to store payload data sets, and another memory unit can be adapted to store control data sets, both sub-units being accessed by the streaming unit 3 during data streaming.

Figure 7:
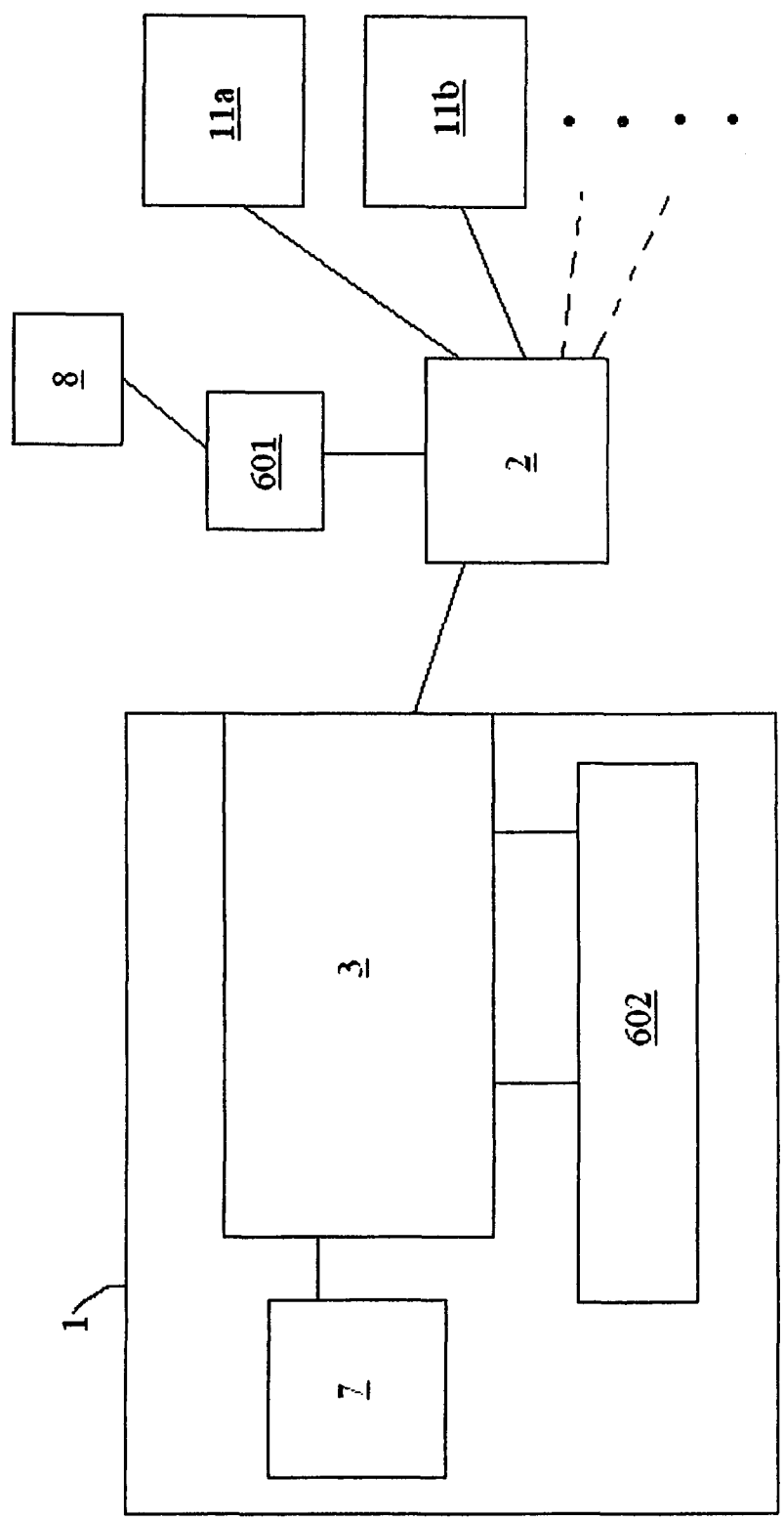
FIG. 7 is a block diagram of a data network and devices connected thereto including a data streaming device according to an alternative embodiment of the invention.

Further, the control unit 6 can be provided in a separate apparatus, for example a computer, which could be located remotely from the streaming unit 3 and the memory unit 7, and connectable thereto via a network. Specially, referring to FIG. 7, in an alternative embodiment, the control unit comprises two sub-units, one of which, here referred to as a request device 602 is provided at the streaming unit 3 and is adapted to receive and process user device requests as described above. The other sub-unit, herein referred to as a pre-processing unit 601, could be located remotely from other streaming device components and be adapted to perform the above described pre-processing of media data.

According to a special but still example embodiment, the streaming unit 3 is adapted to encrypt a payload data set 9a, 9b to at least one of the user devices 11a, 11b. As shown in FIG. 2, the control unit comprises an encryption key storage unit 6c adapted to store the at least one encryption key K101, K102. The encryption key storage unit 6c could be in any suitable form, for example a RAM, and alternatively provided as a unit separate from the control unit 6, but accessible to the latter. The encryption key storage unit 6c stores encryption keys K101, K102, and data mapping each encryption key K101, K102 to a payload data set 9a, 9b and at least one user device 11a, 11b. The user devices 11a, 11b that are mapped to an encryption key stores corresponding encryption keys, in order to decrypt the respective payload data set 9a, 9b when received.

The control unit is adapted to determine, when receiving a streaming request, whether the payload data set 9a, 9b requested is to be encrypted when streamed. The control unit is also adapted to determine, if it is determined that the requested payload data set is to be encrypted, whether the user device 11a, 11b is mapped to an encryption key K101, K102 for the payload data set 9a, 9b. If the user device 11a, 11b does not correspond to an encryption key K101, K102, the requested payload data set will not be streamed.

If it is determined that the user device 11a, 11b is mapped to an encryption key K101, K102, the control unit 6 is adapted to send the encryption key K101, K102 to the networking unit 4, which is adapted to store it, for example in the request data set corresponding to the streaming request, (see above). The networking unit 4 is further adapted to, when receiving from the editing unit 5 the stream portions, (see above), of the payload data set 9a, 9b to be encrypted, to encrypt the stream portions using the encryption key K101, K102, before creating the respective network packets.

Each encryption key K101, K102 can be mapped to one user device K101, K102 or a group of user devices. Thus, this embodiment provides for session-based encryption during streaming, which can be very useful to operators of streaming services.

In data streaming applications, it is desirable to obtain a maximum efficiency in the use of the data transport networks. In particular, the use of bandwidth available should be as efficient as possible.

Figure 8:
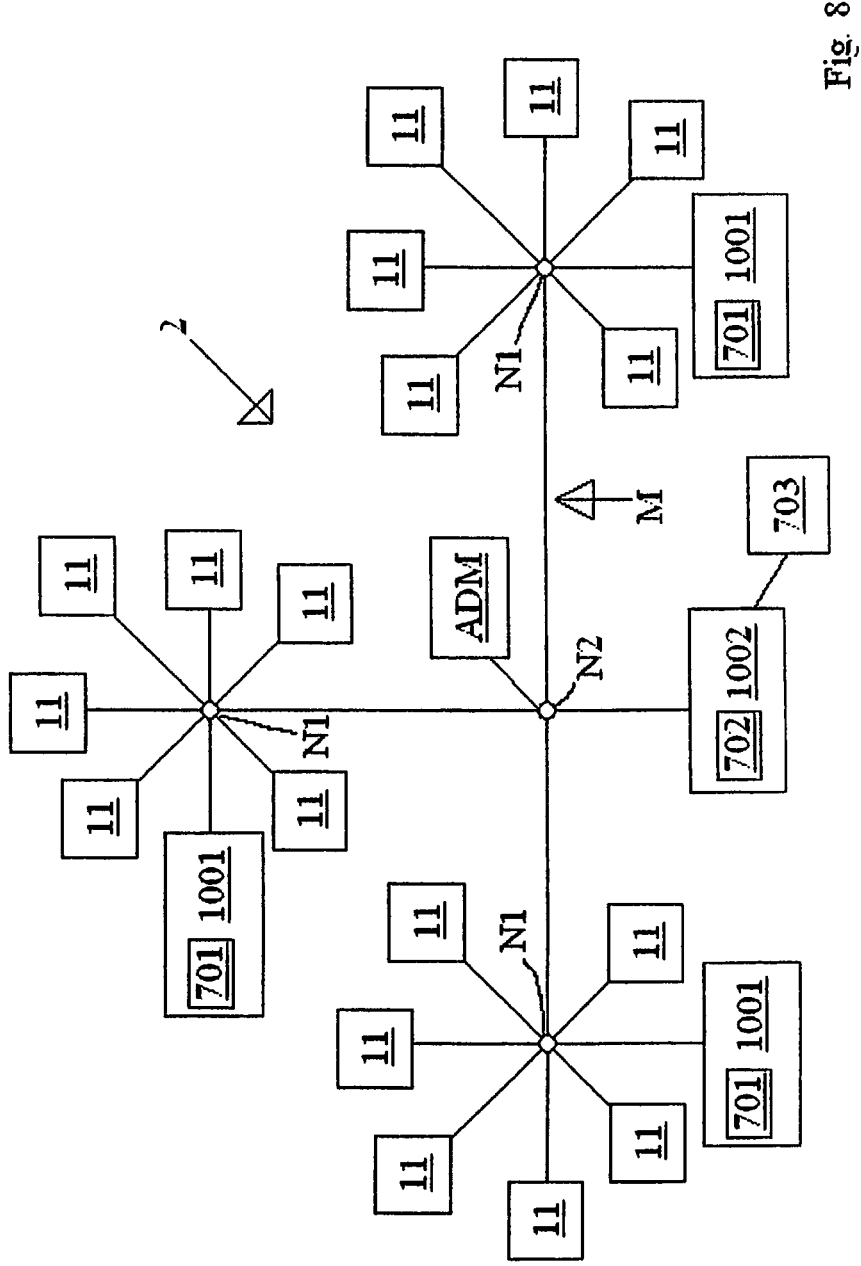
FIG. 8 is a block diagram depicting an arrangement in a network system according to a special aspect of the invention.

In order to increase, in data streaming applications, the efficiency of network utilisation, one aspect of the invention provides an arrangement, one embodiment of which is described here with reference to FIGS. 8 and 9. FIG. 8 is a simplified depiction of a network system comprising one network 2. In practice, the system could comprise any number of networks and any type, such as IP (Internet Protocol), ATM (Asynchronous Transfer Mode), or Ethernet based networks, or a network guided by any other protocol, or a combination of any of different network types.

Connectable to the network are a number of data streaming devices 1001, 1002, each with a memory unit 701, 702 for storing media data, for example as described above, in the form of payload data sets 9a, 9b. Each memory unit 701, 702 is accessible to a streaming unit 3 in the respective streaming device 1001, 1002. The streaming units 3 are adapted to stream the payload data sets 9a, 9b according a plurality of streaming requests from a plurality of user devices 11, also connectable to the network 2.

The network comprises a plurality of nodes N1, N2, in the form of first and second nodes, the second nodes N2 being positioned more centrally in the network 2 than the first nodes N1. FIG. 8 shows three first nodes N1 and one second node N2. First streaming devices 1001 with respective first memory units 701 are connected to a respective of the first nodes N1, and a second streaming device 1002 with a second memory unit 702 is connected to a second node N2. Thus, the second memory unit 702 is positioned more centrally in the network 2 than the first memory units 701.

FIG. 9 is a diagram showing the bandwidth BW requirements for streaming a payload data set in dependence on the data stream request frequency RF for the payload data set, i.e. the popularity of the payload data set. It can be seen that the bandwidth BW requirements increases with the data stream request frequency RF. Connectable to the network 2 is an administration device ADM, in the form of a server, adapted to periodically determine the stream request frequency RF for a plurality of payload data sets stored in the memory units 701, 702. Based on the stream request frequencies RF for the payload data sets, the administration device ADM can relocate payload data sets. More particularly, based at least partly on the stream request frequency RF for a payload data set, the administration device ADM determines whether to store the payload data set in each of the three first memory units 701 or in the second memory unit 702. If the stream request frequency RF for the payload data set is above a first request frequency threshold value RFT1, see FIG. 9, the payload data set is stored in each of the three first memory units 701. If the stream request frequency RF for the payload data set is below the first request frequency threshold value RFT1, the payload data set is stored in the second memory unit 702.

Thus, a degree of distribution in the network system, i.e. more or less centralised, of each memory unit is based at least partly on the stream request frequency RF of the payloads in the respective memory unit. Thereby, a very good balance between bandwidth usage and storage usage is accomplished resulting in a high efficiency in the usage of components in the network system.

Referring to FIG. 10, alternatively, or in addition, the administration device ADM can be adapted to distribute the payload data sets between the first memory units 701 and the second memory unit 702 such that the bandwidth utilisation in the network 2 for streaming payload data sets stored in the first memory units 701 is higher than the bandwidth utilisation in the network system for streaming payload data sets stored in the second memory unit 702. Thereby, the payload data sets stored in the memory units can be divided into two groups. (In alternative embodiments more than two payload data set groups can be introduced.) A first group comprises the payload data sets (in FIG. 10 payload data sets 1-10) having the highest request frequency. A second group comprises payload data sets (in FIG. 10 payload data sets 11-25) having request frequencies all lower than the request frequency of any payload data set in the first group.

Referring to FIGS. 8 and 10, according to this embodiment, all payload data sets in the first group will be stored in the first memory units 701, and all payload data sets in the second group will be stored in the second memory unit 702. If the administration device ADM determines that the request frequency pattern changes, so that the request frequency of a first payload data set in the first group is lower than the request frequency of a second payload data set in the second group, these two payload data sets will be relocated so that second payload data set is stored in the first memory units 701 and the first payload data set is stored in the second memory unit 702.

Referring to FIG. 8, the second streaming device 1002 is connected to a third memory unit 703, which can be located remotely from the second streaming device 1002. The second streaming device comprises a streaming unit 3, and a control unit 6, as described above. The streaming unit 3 is adapted to stream according to user requests, under the control of the control unit 6, payload data sets stored in the third memory unit 703, as well as from the second memory unit 702. It should be noted that the third memory unit 703 can be located anywhere in the network in relationship to the second streaming device 1002. To illustrate this, in the simplified example shown in FIG. 8, the third memory unit 703 can be located in an alternative location indicated by the arrow M.

The data streaming from the third memory unit 703 is performed similarly to what has been described above, with the following essential difference: The second streaming device 1002 communicates with the third memory unit 703 via a network interface. The streaming unit 3 sends read requests to the third memory unit 703 in the form of network packets. The retrieved payload data subsets 91*a*, 91*b* and control data subsets 101*a*, 101*b* (see above) are received from the third memory unit 703 in network packets. The received data packets can contain one or more pairs of payload data subsets 91*a*, 91*b* and control data subsets 101*a*, 101*b*. Alternatively, the received data packets can contain one or more payload data subsets 91*a*, 91*b* or one or more control data subsets 101*a*, 101*b*. As a further alternative, the received data packets can contain one or more portions of payload data subsets 91*a*, 91*b* or one or more portions of control data subsets 101*a*, 101*b*.

The third memory unit 703 can be included in the memory allocation scheme of the administration device ADM. Thus, if the stream request frequency RF for any payload data set is below a second request frequency threshold value RFT2, see FIG. 9, the payload data set is stored in the third memory unit 703.

The above description of illustrated embodiments is not intended to be exhaustive or to limiting. While specific example embodiments are described herein for illustrative purposes, various equivalent modifications are possible, as those skilled in the relevant art will recognize. The teachings provided herein can be applied to other streaming systems, not necessarily the examples described above.

The various embodiments described above can be combined to provide further embodiments. All of the above patents and applications are incorporated by reference. Aspects of the technology can be modified, if necessary, to employ the systems, circuits and concepts of the various patents and applications described above to provide yet further embodiments.

These and other changes can be made in light of the above detailed description. In general, in the following claims, the terms used should not be construed as limiting to the specific embodiments disclosed, but should be construed to include all streaming media systems that operate under the claims to provide a method for separating control from streaming. Accordingly, the invention is not limited by the disclosure, but instead the scope of the invention is to be determined by the following claims.

The invention claimed is:

1. An apparatus for data streaming configured to receive media data in the form of a plurality of payload data sets from at least one data source and a plurality of streaming requests from a plurality of user devices, the apparatus comprising:

a control unit configured to divide payload data set into a plurality of payload sub-sets and to create a control data set for each payload data set, the control data set being related to a respective payload data set and comprising a plurality of control data sub-sets, the control unit further being configured to locate a plurality of full data frames within a payload data set and to provide in each of a plurality of edit portions of each control data sub-set linking data corresponding to the location of one full data frame from the plurality of full data frames to be used upon streaming of the payload data sets in accordance with any one of multiple modes, a random access memory unit configured to store the payload data sets and the plurality of control data sets at randomly accessible locations in the random access memory unit, and a streaming unit configured to: stream the payload data sets according to the streaming requests, receive from the random access memory unit sub-sets of a first payload data set, receive from the random access memory unit control data sub-sets, each comprising data corresponding to a randomly accessible location in the random access memory unit of a sub-set of the first payload data set, receive from the random access memory unit a first sub-set of the first payload data set and a first sub-set of the control data set, which first control data sub-set comprises data corresponding to a randomly accessible location in the random access memory unit of a second sub-set of the first payload data set, wherein the first sub-set of the payload data set and the first sub-set of the control data set are stored together in the random access memory unit so that when the streaming unit accesses the random access memory unit to read the first sub-set of the payload data set, the streaming unit also reads the first sub-set of the control data set in the random access memory unit during the same memory access, and wherein the random access memory unit comprises a plurality of memory sectors, and wherein the payload data set and the control data set are arranged in pairs of payload data sub-sets and control data sub-sets, each pair being configured to the size of the memory sectors and stored in a respective one of the memory sectors.

2. An apparatus according to claim 1, wherein each of at least some of the control data sub-sets in the pairs of payload data sub-sets and control data sub-sets comprises data corresponding to a location of a memory sector of another pair.

3. An apparatus according to claim 1, wherein the control unit is configured to send the pairs of payload data sub-sets and control data sub-sets to an editing unit which is configured to forward them to the random access memory unit.

4. An apparatus according to claim 1, wherein the full data frame is a portion of media data comprised in the payload data set not referring to another portion of media data comprised in the payload data set.

5. A data structure for use in an apparatus according to claim 1, the data structure comprising a first data element configured to represent portions of media data and a second data element configured to represent control data prepared at the receipt of the media data and corresponding to selected memory locations of other portions of the media data,
wherein the control data from the second data element may be used to stream the other portions of the media data to a user device.

6. A method for data streaming, comprising:
receiving media data in the form of a plurality of payload data sets from at least one data source and a plurality of streaming requests from a plurality of user devices,
dividing the payload data set into a plurality of payload data sub-sets,
creating a control data set for each payload data set, the control data set being related to a respective payload data set and comprising a plurality of control data sub-sets,
locating a plurality of full data frames within a payload data set,
providing in each of a plurality of edit portions of each control data sub-set linking data corresponding to the location of one full data frame from the plurality of full data frames to be used upon streaming of the payload data sets in accordance with any one of multiple modes,
storing the payload data sets and the plurality of control data sets at randomy accessible locations in a random access memory unit,
streaming the payload data sets according to the streaming requests, and
receiving from the random access memory unit payload data sub-sets of a first payload data set, control data sub-sets, each comprising data corresponding to a randomly accessible location in the random access memory unit of a sub-set of the first payload data set, and a first sub-set of the first payload data set and a first sub-set of the control data set, which first control data sub-set comprises data corresponding to a randomly accessible location in the random access memory unit of a second sub-set of the first payload data set,
wherein the first sub-set of the payload data set and the first sub-set of the control data set are stored together in the random access memory unit so that when the streaming unit accesses the random access memory unit to read the first sub-set of the payload data set, the streaming unit also reads the first sub-set of the control data set in the random access memory unit during the same memory access,
wherein the random access memory unit comprises a plurality of memory sectors, and
wherein the payload data set and the control data set are arranged in pairs of payload data sub-sets and control data sub-sets, each pair being configured to the size of the memory sectors and stored in a respective one of the memory sectors.

7. A method according to claim 6, wherein each of at least some of the control data sub-sets in the pairs of payload data sub-sets and control data sub-sets comprises data corresponding to a location of a memory sector of another pair.

8. A method according to claim 6, further comprising sending the pairs of payload data sub-sets and control data sub-sets to an editing unit which is configured to forward them to the random access memory unit.

9. A method according to claim 6, wherein the full data frame is a portion of media data comprised in the payload data set not referring to another portion of media data comprised in the payload data set.

10. An apparatus for data streaming configured to receive a plurality of streaming requests from a plurality of user devices, the apparatus comprising:
a control unit configured to receive media data in the form of a plurality of payload data sets from at least one data source,
a random access memory unit configured to store the payload data sets at randomly accessible locations in the random access memory unit,
a streaming unit configured to stream the payload data sets according to the streaming requests,
the control unit being configured to pre-process the payload data sets before being stored such that control data sets are created,
the streaming unit being configured to receive from the random access memory unit a first sub-set of a first set of payload data and a first sub-set of a first set of control data, which comprises data corresponding to a randomly accessible location in the random access memory unit of a second sub-set of the first set of payload data, and to stream the payload data sets using the control data sets,
wherein the control unit is configured to, when pre-processing a payload data set, divide it into a plurality of payload data sub-sets and create for each of at least some of the payload data sub-sets a control data sub-set, each comprising data corresponding to a randomly accessible location in the random access memory unit of another payload data sub-set,
wherein the first sub-set of the payload data set and the first sub-set of the control data set are stored together in the random access memory unit so that when the streaming unit accesses the random access memory unit to read the first sub-set of the payload data set, the streaming unit also reads the first sub-set of the control data set during the same memory access,
wherein the random access memory unit comprises a plurality of memory sectors,
wherein the payload data set and the control data set are each arranged in pairs of payload data sub-sets and control data sub-sets, each pair being configured to the size of a memory sector and stored in a respective one of the memory sectors, and
wherein each of at least some of the control data sub-sets in the pairs of payload data sub-sets and control data sub-sets comprises data corresponding to a location of a memory sector of another pair.

11. An apparatus according to claim 10, wherein the streaming unit is configured to store for each of at least some of the streaming requests a request data set related to the respective streaming request, to create data packets, each based at least partly on a portion of a payload data set and a request data set, and to send the data packets to the user devices.

12. An apparatus according to claim 10, wherein the streaming unit is configured to determine, based at least partly on a plurality of time codes in each of at least some of the payload data sets, bit-rate information and to stream portions of the payload data sets based on the bit-rate information.

13. An apparatus according to claim 10, wherein the control unit comprises a software controlled processor, and the streaming unit comprises a hard-coded programmed logic device.

14. An apparatus according to claim 10, wherein the streaming unit is configured to encrypt a payload data set to at least one of the user devices, and
wherein the streaming unit is configured to encrypt the payload data set according to at least one encryption key, each corresponding to at least one of the user devices.

15. An apparatus according to claim 14, wherein the streaming unit is configured to encrypt the payload data set when streamed.

16. An apparatus for data streaming a configured to receive a plurality of streaming requests including mode requests from a plurality of user devices, the apparatus comprising:
a random access memory unit configured to store at randomly accessible locations in the random access memory unit media data in the form of a plurality of payload data sets and to store a plurality control data sets, the control data sets being related to a respective payload set and comprising a plurality of control data sub-sets,
a state device configured to set a mode in accordance with each one of the mode requests and to control the data streaming, and
a streaming unit configured to stream the payload data sets in accordance with the set mode by receiving from the random access memory unit a plurality of control data sub-sets, each comprising at least two edit portions, each edit portion relating to one of the modes and comprising data corresponding to a randomly accessible address corresponding to a location in the random access memory unit to a payload data sub-set stored in the random access memory unit, selecting the edit portion relating to the set mode, and streaming the payload data sub-sets given by the edit portion and the randomly accessible address,
wherein the streaming unit is configured to receive from the memory unit a first sub-set of a first payload data set and a first sub-set of the control data set, which first control data sub-set comprises a first edit portion comprising data corresponding to a location in the random access memory unit of a second sub-set of the first payload data set, and a second edit portion comprising data corresponding to a location in the random access memory unit of a third sub-set of the first payload data set,
wherein the first sub-set of the payload data set and the first sub-set of the control data set are stored together in the random access memory unit so that when the streaming unit accesses the memory unit to read the first sub-set of the payload data set, the streaming unit also reads the first sub-set of the control data set during the same memory access,
wherein the random access memory unit comprises a plurality of memory sectors, and
wherein the payload data sets and the control data sets are each arranged in pairs of payload data sub-sets and control data sub-sets, each pair being configured to the size of a memory sector and stored in a respective one of the memory sectors.

17. An apparatus according to claim 16, comprising a control unit configured to receive the payload data sets from at least one data source, pre-process the payload data sets before being stored by dividing a payload data set into a plurality of payload data sub-sets, and create for each of at least some of the payload data sub-sets a control data sub-set.

18. An apparatus according to claim 17, wherein the control unit is configured in wed to locate a plurality of identification data groups within a payload data set and provide in each of a plurality of the edit portions of the control data sub-sets data corresponding to the location of an identification data group.

19. An apparatus according to claim 18, wherein each identification data group corresponds to a full image data frame.

20. An apparatus according to claim 16, wherein the streaming unit is configured to provide the portions of the media data to the user device in accordance with one of a fast forward, a replay, a play, or a rewind corresponding to the set mode.

21. An apparatus according to claim 16, wherein the state device is configured to send, in response to stream identify information from a pacing device, a control signal to a multiplexer to adjust a setting of the multiplexer to the mode request of the stream being served.

22. A combination of an apparatus according to claim 16 and a plurality of user devices from which the apparatus is configured to receive the plurality of streaming requests.

23. A combination according to claim 22, wherein the user devices are audio/video devices.

24. A combination according to claim 23, wherein the audio/video devices are at least one of set-top boxes, personal video recorders, or personal computers.

25. A method for data streaming, comprising:
receiving a plurality of streaming requests including mode requests from a plurality of user devices,
storing media data in the form of a plurality of payload data sets at randomly accessible locations in a random access memory unit,
storing, at randomly accessible locations in the random access memory unit, a plurality of control data sets, the control data sets being related to the respective stored payload set and comprising a plurality of control data sub-sets,
setting a mode in accordance with each one of the mode requests and controlling the data streaming using a state device,
streaming the payload data sets in accordance with set modes,
receiving from the random access memory unit a plurality of control data sub-sets, each comprising at least two edit portions, each edit portion relating to one of the possible modes and comprising data corresponding to an address to a payload data sub-set stored in the random access memory unit,
selecting the edit portion relating to a set mode, and
streaming the payload data sub-sets given by the edit portion and the address, comprising receiving from the random access memory unit a first sub-set of a first payload data set and a first sub-set of the control data set, which first control data sub-set comprises a first edit portion comprising data corresponding to a randomly accessible location in the random access memory unit of a second sub-set of the first payload data set, and a second edit portion comprising data corresponding to a randomly accessible location in the random access memory unit of a third sub-set of the first payload data set,
wherein the first sub-set of the payload data set and the first sub-set of the control data set are stored together in the random access memory unit so that when the streaming unit accesses the random access memory unit to read the first sub-set of the payload data set, the streaming unit also reads the first sub-set of the control data set during the same memory access, wherein the random access memory unit comprises a plurality of memory sectors, and wherein the payload data sets and the control data sets are each arranged in pairs of payload data sub-sets and control data sub-sets, each pair being configured in size to the size of a memory sector and stored in a respective one of the memory sectors.

26. A method according to claim 25, comprising receiving the payload data sets from at least one data source, pre-processing the payload data sets before being stored by dividing a payload data set into a plurality of payload data sub-sets, and creating for each of at least some of the payload data sub-sets a control data sub-set.

27. A method for data streaming, comprising:

receiving media data in the form of a plurality of payload data sets from at least one data source, storing the payload data sets at randomly accessible locations in a random access memory unit, receiving a plurality of streaming requests from a plurality of user devices, streaming the payload data sets according to the streaming requests, pre-processing the payload data sets before being stored such that control data sets are created, receiving a first sub-set of a first set of payload data from the memory unit, and receiving from the memory unit a first sub-set of a first set of control data, which comprises data corresponding to a randomly accessible location in the random access memory unit of a second sub-set of the first set of payload data, streaming the payload data sets using the control data sets, comprising dividing, when pre-processing a payload data set, it into a plurality of payload data sub-sets, and creating for each of at least some of the payload data sub-sets a control data sub-set, each comprising data corresponding to a randomly accessible location in the random access memory unit of another payload data sub-set, wherein the first sub-set of the payload data set and the first sub-set of the control data set are stored together in the random access memory unit so that when the streaming unit accesses the random access memory unit to read the first sub-set of the payload data set, the streaming unit also reads the first sub-set of the control data set during the same memory access, wherein the random access memory unit comprises a plurality of memory sectors, wherein the payload data set and the control data set are arranged in pairs of payload data sub-sets and control data sub-sets, each pair being stored in a respective one of the memory sectors, and wherein each of at least some of the control data sub-sets in the pairs of payload data sub-sets and control data sub-sets comprises data corresponding to a location of a memory sector of another pair.

* * * * *